(12) United States Patent
Gray

(10) Patent No.: US 11,374,851 B2
(45) Date of Patent: *Jun. 28, 2022

(54) METHODS AND APPARATUS FOR CONTROLLING AND MAKING LINK BUNDLE ADVERTISEMENTS TO SUPPORT ROUTING DECISIONS

(71) Applicant: Charter Communications Operating, LLC, St. Louis, MO (US)

(72) Inventor: Willard Andrew Gray, Castle Rock, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/740,478

(22) Filed: Jan. 12, 2020

(65) Prior Publication Data

US 2020/0153727 A1 May 14, 2020

Related U.S. Application Data

(63) Continuation of application No. 16/130,715, filed on Sep. 13, 2018, now Pat. No. 10,536,366.

(51) Int. Cl.
*H04L 12/26* (2006.01)
*H04L 45/12* (2022.01)
(Continued)

(52) U.S. Cl.
CPC ............ *H04L 45/123* (2013.01); *H04L 45/02* (2013.01); *H04L 45/22* (2013.01); *H04L 45/245* (2013.01); *H04L 45/70* (2013.01); *H04L 45/28* (2013.01)

(58) Field of Classification Search
CPC ....... H04L 45/123; H04L 45/70; H04L 45/22; H04L 45/245; H04L 45/02; H04L 45/28
(Continued)

(56) References Cited

U.S. PATENT DOCUMENTS 5,535,195 A * 7/1996 Lee .......................... H04L 45/02
370/256
9,705,809 B2 * 7/2017 Zhang ..................... H04L 25/14
(Continued)

OTHER PUBLICATIONS

Examples: Configuring OSPF Traffic Control—Technical Documentation—Support—Juniper Networks, Dec. 6, 2016, pp. 1-9 pages.
(Continued)

*Primary Examiner* — Thai D Hoang
(74) *Attorney, Agent, or Firm* — Straub & Straub; Michael P. Straub; Stephen T. Straub

(57) ABSTRACT

Methods and apparatus relating to the use of aggregated links, e.g., links in a bundle, are described. A normal link metric and a limited operation mode link metric a determined for a link bundle, the normal link metric having a lower value than the limited operational mode link metric. The status of links in a link bundle are monitored. Based on the number of currently operational links in a link bundle and a switching threshold, a decision is made whether to advertise the normal link metric, advertise the limited operation mode threshold or refrain from advertising any link metric. The use of the limited operation link metric facilitates the use of a partially failed link bundle providing an alternative routing path in the network that would not otherwise be available.

27 Claims, 30 Drawing Sheets

(51) Int. Cl.
*H04L 45/00* (2022.01)
*H04L 45/24* (2022.01)
*H04L 45/02* (2022.01)
*H04L 45/28* (2022.01)

(58) Field of Classification Search
USPC .............................. 370/389–395.21, 400–410
See application file for complete search history.

(56) References Cited

U.S. PATENT DOCUMENTS

| | | | | |
|---|---|---|---|---|
| 10,536,366 | B1* | 1/2020 | Gray | H04L 45/123 |
| 2005/0251399 | A1* | 11/2005 | Agarwal | G06F 16/958 |
| | | | | 705/1.1 |
| 2005/0265330 | A1* | 12/2005 | Suzuki | H04L 49/555 |
| | | | | 370/389 |
| 2005/0276251 | A1* | 12/2005 | Biddiscombe | H04L 41/12 |
| | | | | 370/338 |
| 2006/0092950 | A1* | 5/2006 | Arregoces | H04L 45/24 |
| | | | | 370/396 |
| 2007/0133618 | A1* | 6/2007 | Brolin | H04L 12/18 |
| | | | | 370/514 |
| 2007/0177599 | A1* | 8/2007 | Yazaki | H04L 41/0896 |
| | | | | 370/392 |
| 2008/0186865 | A1* | 8/2008 | Yong | H04L 41/0893 |
| | | | | 370/244 |
| 2008/0291927 | A1* | 11/2008 | Yong | H04L 47/10 |
| | | | | 370/400 |
| 2010/0011230 | A1* | 1/2010 | Mater | G06F 1/3215 |
| | | | | 713/320 |
| 2012/0106465 | A1* | 5/2012 | Haghighat | H04W 72/1289 |
| | | | | 370/329 |
| 2013/0003559 | A1* | 1/2013 | Matthews | H04L 43/0876 |
| | | | | 370/241 |
| 2015/0373587 | A1* | 12/2015 | Josiam | H04W 28/20 |
| | | | | 370/338 |
| 2016/0094436 | A1* | 3/2016 | Elder | H04L 45/245 |
| | | | | 370/225 |

OTHER PUBLICATIONS

OSPF Commands on Cisco IOS XR Software, Mar. 9, 2010, 202 pages.

* cited by examiner

FIGURE 10

| LINK BUNDLE NUMBER | NORMAL LINK METRIC (NLM) | LIMITED OPERATION THRESHOLD NUMBER | LIMITED OPERATION MODE LINK METRIC (LOMLM) | CURRENT MODE | NUMBER OF OPERATIONAL LINKS | ADVERTISE LINK METRIC |
|---|---|---|---|---|---|---|
| B1 | 2 | 3 | 9 | LIMITED | 3 | Y |
| B2 | 2 | 3 | 9 | DOWN | 0 | N |
| B3 | 1 | 3 | 9 | DOWN | 0 | N |
| B4 | 2 | 3 | 9 | NORMAL | 9 | Y |
| B5 | 2 | 3 | 9 | DOWN | 0 | N |
| B6 | 1 | 3 | 9 | NORMAL | 9 | Y |
| B7 | 1 | 3 | 9 | NORMAL | 9 | Y |

BUNDLE INFORMATION

1002 ← table; 1004 NLM; 1006 threshold; 1008 LOMLM; 1010 current mode; 1012 operational links; 1014 advertise link metric; 1016–1028 rows B1–B7

ASSEMBLY OF COMPONENTS (PART C) — 1305

1352 — COMPONENT CONFIGURED TO TAKE AN ADVERTISING ACTION IN ACCORDANCE WITH THE DETERMINED FIRST LINK BUNDLE METRIC ADVERTISING DECISION, SAID ADVERTISING ACTION INCLUDING OPERATING THE FIRST NODE TO: i) ADVERTISE THE NORMAL LINK BUNDLE METRIC FOR THE FIRST LINK BUNDLE; ii) ADVERTISES THE LIMITED OPERATION MODE LINK BUNDLE METRIC FOR THE FIRST LINK BUNDLE OR iii) CONTROL THE FIRST NODE TO REFRAIN FROM ADVERTISING A LINK BUNDLE METRIC FOR THE FIRST LINK BUNDLE

1354 — COMPONENT CONFIGURED TO DETERMINE IF THE FIRST LINK METRIC ADVERTISING DECISION IS A DECISION TO ADVERTISE ONE OF THE NORMAL LINK METRIC OR THE LIMITED OPERATION MODE LINK METRIC FOR THE FIRST LINK BUNDLE AND TO CONTROL OPERATION AS A FUNCTION OF THE DETERMINATION

1356 — COMPONENT CONFIGURED TO DETERMINE IF THE FIRST LINK METRIC ADVERTISING DECISION IS A DECISION TO ADVERTISE THE NORMAL LINK METRIC AND TO CONTROL OPERATION AS A FUNCTION OF THE DETERMINATION

1358 — COMPONENT CONFIGURED TO OPERATE THE FIRST NODE TO ADVERTISE THE NORMAL LINK BUNDLE METRIC FOR THE FIRST LINK BUNDLE

1360 — COMPONENT CONFIGURED TO OPERATE A TRANSMITTER IN THE FIRST NODE TO TRANSMIT THE NORMAL LINK BUNDLE METRIC FOR THE FIRST LINK BUNDLE

1362 — COMPONENT CONFIGURED TO OPERATE THE FIRST NODE TO ADVERTISE THE LIMITED OPERATION MODE LINK BUNDLE METRIC FOR THE FIRST LINK BUNDLE

1364 — COMPONENT CONFIGURED TO OPERATE A TRANSMITTER IN THE FIRST NODE TO TRANSMIT THE LIMITED OPERATION MODE LINK BUNDLE METRIC FOR THE FIRST LINK BUNDLE

1366 — COMPONENT CONFIGURED TO OPERATE THE FIRST NODE TO CONTROL NODE TO REFRAIN FROM ADVERTISING A LINK BUNDLE METRIC FOR THE FIRST LINK BUNDLE

1368 — COMPONENT CONFIGURED TO SET A VALUE IN MEMORY INDICATING THAT A LINK BUNDLE METRIC IS NOT TO BE TRANSMITTED FOR THE FIRST LINK BUNDLE

FIGURE 13C

| FIGURE 13A | FIGURE 13B | FIGURE 13C |

FIGURE 13

| | | BUNDLE INFORMATION FOR AN EXEMPLARY LINK BUNDLE, WHERE LIMITED OPERATION MODE LINK METRIC IS A MAXIMUM LINK WEIGHT VALUE | | | | |
|---|---|---|---|---|---|---|
| TIME | NORMAL LINK METRIC (NLM) | LIMITED OPERATION THRESHOLD | LIMITED OPERATION MODE LINK METRIC (LOMLM) | NUMBER OF OPERATIONAL LINKS | CURRENT MODE | ADVERTISE LINK METRIC |
| T0 | 2 | 3 | 9 | 9 | NORMAL | Y |
| T1 | 2 | 3 | 9 | 7 | NORMAL | Y |
| T2 | 2 | 3 | 9 | 4 | NORMAL | Y |
| T3 | 2 | 3 | 9 | 3 | LIMITED | Y |
| T4 | 2 | 3 | 9 | 1 | LIMITED | Y |
| T5 | 2 | 3 | 9 | 0 | DOWN | N |

FIGURE 17

| BUNDLE INFORMATION FOR AN EXEMPLARY FIRST LINK BUNDLE, WHERE LIMITED OPERATION MODE LINK METRIC IS A MULTIPLE, E.G. 4X, OF A NORMAL LINK METRIC | | | | | | |
|---|---|---|---|---|---|---|
| TIME | NORMAL LINK METRIC (NLM) | LIMITED OPERATION THRESHOLD | LIMITED OPERATION MODE LINK METRIC (LOMLM) | NUMBER OF OPERATIONAL LINKS | CURRENT MODE | ADVERTISE LINK METRIC |
| T0 | 2 | 3 | 8 | 9 | NORMAL | Y |
| T1 | 2 | 3 | 8 | 7 | NORMAL | Y |
| T2 | 2 | 3 | 8 | 4 | NORMAL | Y |
| T3 | 2 | 3 | 8 | 3 | LIMITED | Y |
| T4 | 2 | 3 | 8 | 1 | LIMITED | Y |
| T5 | 2 | 3 | 8 | 0 | DOWN | N |

FIGURE 18

| TIME | NORMAL LINK METRIC (NLM) | LIMITED OPERATION THRESHOLD | LIMITED OPERATION MODE LINK METRIC (LOMLM) | NUMBER OF OPERATIONAL LINKS | CURRENT MODE | ADVERTISE LINK METRIC |
|---|---|---|---|---|---|---|
| T0 | 1 | 3 | 4 | 9 | NORMAL | Y |
| T1 | 1 | 3 | 4 | 7 | NORMAL | Y |
| T2 | 1 | 3 | 4 | 4 | NORMAL | Y |
| T3 | 1 | 3 | 4 | 3 | LIMITED | Y |
| T4 | 1 | 3 | 4 | 1 | LIMITED | Y |
| T5 | 1 | 3 | 4 | 0 | DOWN | N |

BUNDLE INFORMATION FOR AN EXEMPLARY SECOND LINK BUNDLE, WHERE LIMITED OPERATION MODE LINK METRIC IS A MULTIPLE, E.G. 4X, OF A NORMAL LINK METRIC

FIGURE 19

| TIME | NORMAL LINK METRIC (NLM) | LIMITED OPERATION THRESHOLD | NUMBER OF OPERATIONAL LINKS | COST FACTOR | LIMITED OPERATION MODE LINK METRIC (LOMLM) | CURRENT MODE | ADVERTISE LINK METRIC |
|------|--------------------------|-----------------------------|-----------------------------|-------------|---------------------------------------------|--------------|-----------------------|
| T0 | 2 | 3 | 9 | 3.5 | 7 | NORMAL | Y |
| T1 | 2 | 3 | 4 | 3.5 | 7 | NORMAL | Y |
| T2 | 2 | 3 | 3 | 3.5 | 7 | LIMITED | Y |
| T3 | 2 | 3 | 2 | 4 | 8 | LIMITED | Y |
| T4 | 2 | 3 | 1 | 4.5 | 9 | LIMITED | Y |
| T5 | 2 | 3 | 0 | 4.5 | 9 | DOWN | N |

BUNDLE INFORMATION FOR AN EXEMPLARY LINK BUNDLE, WHERE LIMITED OPERATION MODE LINK METRIC IS A FUNCTION OF THE DETERMINED NUMBER OF OPERATIONAL LINKS

FIGURE 20

METHODS AND APPARATUS FOR CONTROLLING AND MAKING LINK BUNDLE ADVERTISEMENTS TO SUPPORT ROUTING DECISIONS

RELATED APPLICATIONS

The present application is a continuation of U.S. patent application Ser. No. 16/130,715, which was filed on Sep. 13, 2018 and which is hereby expressly incorporated by reference in its entirety

FIELD

The present application relates to communications methods and, more particularly, to methods and apparatus for determining and communicating link and/or link bundle information which can be used for making routing decisions.

BACKGROUND

Link metrics, often referred to as link weights, are sometimes advertised and used in a communications network by devices trying to make routing decisions with regard to which path to use. For example, in the case of shortest path first routing, link metrics indicative of path length are advertised and routing decisions are made based on the advertised link metrics, e.g., with the links which result in the lowest cumulative link metric between a source device and destination device being selected for inclusion in a route between the source and destination device. In other cases where the link metrics represent cost metrics, the advertised link metrics are normally indicative of a cost associated with a link. In a cost based approach to routing a device will normally select the lowest cost path as indicated by selecting a path with the lowest overall cost as indicated by the cumulative sum of the link metrics of each link in the selected path.

Link aggregation allows multiple links, e.g., Ethernet links, into a single logical link between two networked devices. An aggregation of links is often referred to as a bundle. For purposes of advertising a link metric, the logical link is treated as a single link even though it represents a bundle of individual links. Accordingly, a single link metric is normally advertised for a bundle.

Link Aggregation Control Protocol (LACP) is an IEEE standard defined in IEEE 802.3ad. LACP lets devices send Link Aggregation Control Protocol Data Units (LACPDUs) to each other to establish a link aggregation connection. The metric used to facilitate routing decisions is often communicated as a Link Aggregation Control Protocol Data unit.

A useful feature of LACP is that when one member link stops sending LACPDUs (if the cable is unplugged, for example), it is removed from the link aggregation group (LAG). This helps to minimize packet loss.

In the case of link bundles, it is often possible to configure a device to stop advertising a metric for a link bundle if the number of operational links in the bundle falls below a configured number of links, e.g., a number of links expected to be needed to support a normal or anticipated traffic load. Once a metric for the bundle ceases to be advertised, the bundle will normally be removed from the set of links which are considered by devices for routing purposes in accordance with the link protocol being used.

Removing a bundle which can no longer handle the expected normal traffic load reduces the risk of packet loss, e.g., due to overloading of a bundle which is suffering from one or more faulty connections or links which reduce its capacity. Networks are often designed with sufficient redundancy that if one link bundle fails another, e.g., redundant, link bundle will be able to handle the load.

While the removal of one bundle from a network from one or more link failures in the links which form the bundle may not have significant impact on a network, the failure of multiple bundles may result in a portion of a network being coming isolated.

In view of the above discussion it should be appreciated that there is a need for methods and/or apparatus which would allow a bundle to be removed from being used when a functional alternative bundle can serve as an alternative path for the full normal traffic flow but which would leave the bundle as an available link, albeit one that might not be able to support the full normal traffic flow, in cases where failure to use the one or more functional links in the bundle would result in a portion of a network becoming isolated due to the lack of a good alternative link or bundle.

SUMMARY

Methods and apparatus relating to the use of aggregated links, e.g., links in a bundle, are described. In accordance with various features when the number of links in a bundle drops below a predetermined number of links, e.g., a number of links which can and sometimes is set on a per bundle basis taking into consideration the number of functional links required to support the expected normal bundle traffic load of the bundle, a switch is made between advertising a normal bundle link metric to advertising a limited operation mode link bundle metric. In some embodiments, the predetermined number or links is 1 greater than the limited operation mode number of links. In some cases the limited operation mode link bundle metric is set to the maximum possible link metric value. While in some embodiments for normal operation the link metric is a metric based on path length or cost, in the case of limited operation mode the metric is one which is intended to discourage use of the bundle as a link. When the link metric value is set to the maximum possible value the faulty link bundle becomes a link of last resort since it will be perceived as the longest, most costly, or otherwise undesirable link in any set of possible links being considered for routing purposes since the link metric is set to the maximum possible value. In other embodiments the link metric advertised for a link in limited operation mode is a multiple of the normal link metric for the link bundle. Thus the link bundle will be less desirable from a routing perspective discoursing use of the bundle below what would be its normal level of use. In some embodiments the limited operation mode metric for a bundle is determined based on the number of links which remain available for use with the metric increasing in value as the number of links decreased from the threshold number used to trigger limited link mode operation.

While adverting a large link metric for a link bundle can significantly decrease the likelihood that a bundle will be used and in some cases makes the bundle a link of last resort, advertising a limited mode link metric for a faulty bundle unable to support its normal traffic load keeps the remaining links in the bundle available for use and can avoid a network segment from becoming isolated as might be the case if multiple partial bundle failures triggered nodes to stop advertising link metrics making the links of the bundles unavailable.

While in various embodiments the methods and apparatus are used in the context of Ethernet link bundles and LACP, the methods and apparatus can be used in wide range of communications networks and with various type of communications links which may be aggregated into a bundle and which can thus serve as a logical link between two network nodes.

An exemplary method of operating a first node in a communications network, in accordance with some embodiments, comprises: determining a normal link bundle metric for a first link bundle including a plurality of communications links between a first network node and a second network node; determining a limited operation mode link bundle metric for the first link bundle; and making a first link bundle metric advertising decision, said first link bundle metric advertising decision being a decision to: i) advertise the normal link bundle metric for the first link bundle; ii) advertise the limited operation mode link bundle metric for the first link bundle; or iii) perform no advertising of a link bundle metric for the first link bundle; and taking an advertising action in accordance with the determined first link bundle metric advertising decision, said advertising action including operating the first node to: i) advertise the normal link bundle metric for the first link bundle, ii) advertise the limited operation mode link bundle metric for the first link bundle or iii) control the first node to refrain from advertising a link bundle metric for the first link bundle.

While various features discussed in the summary are used in some embodiments it should be appreciated that not all features are required or necessary for all embodiments and the mention of features in the summary should in no way be interpreted as implying that the feature is necessary or critical for all embodiments.

Numerous additional feature and embodiments are described in the detailed description which follows.

BRIEF DESCRIPTION OF THE FIGURES

FIG. 7B is a fourth part of a flowchart of an exemplary method of operating a node, e.g., a router, in accordance with an exemplary embodiment.

FIG. 10 is a drawing of a table illustrating exemplary link bundle information corresponding to the example of FIG. 3 and FIG. 6.

FIG. 13C is a drawing of a third part of an exemplary assembly of components which may be included in an exemplary communications device, e.g., a router, in accordance with an exemplary embodiment.

FIG. 13 comprises the combination of FIG. 13A, FIG. 13 B and FIG. 13C.

FIG. 17 is a drawing of a table illustrating exemplary bundle information for an exemplary link bundle, wherein the limited operation mode link metric for the link bundle is a maximum link weight value, in accordance with an exemplary embodiment.

FIG. 18 is a drawing of a table illustrating exemplary bundle information for an exemplary first link bundle, wherein the limited operation mode link metric for the first link bundle is a multiple, e.g., 4X, of the normal link metric for the first link bundle, in accordance with an exemplary embodiment.

FIG. 19 is a drawing of a table illustrating exemplary bundle information for an exemplary second link bundle, wherein the limited operation mode link metric for the second link bundle is multiple, e.g., 4X, of the normal link metric for the second link bundle, in accordance with an exemplary embodiment.

FIG. 20 is a drawing of a table illustrating exemplary bundle information for an exemplary link bundle, wherein the limited operation mode link metric for the link bundle is a function of the determined number of operational links in the link bundle, in accordance with an exemplary embodiment.

FIG. 21C is a drawing of a third part of an exemplary assembly of components which may be included in an exemplary communications device, e.g., a router, in accordance with an exemplary embodiment.

DETAILED DESCRIPTION

Figure 1:
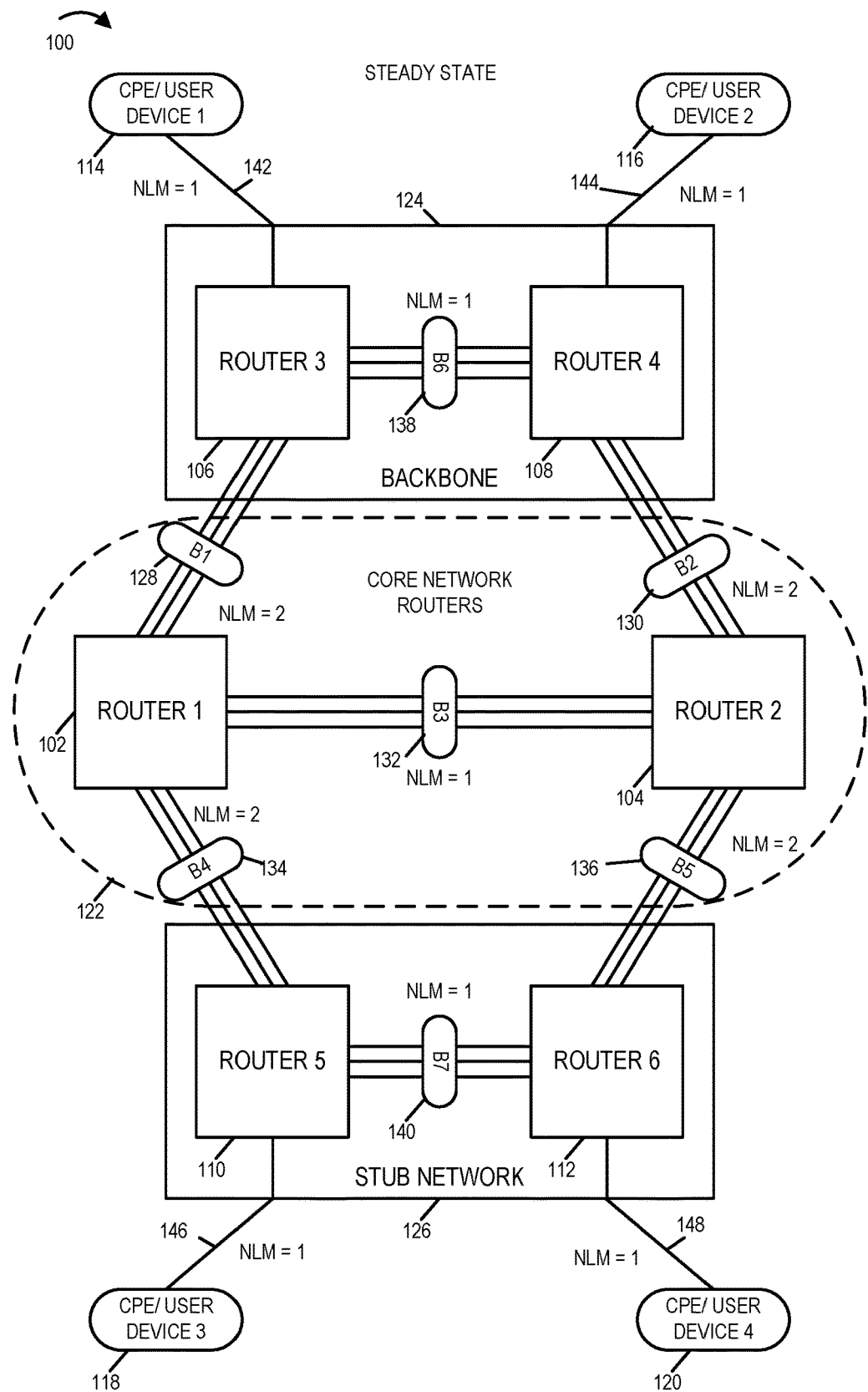
FIG. 1 illustrates an exemplary communications system, implemented in accordance with an exemplary embodiment, during failure free operation in which each of the routers are advertising normal link metrics.

FIG. 1 illustrates an exemplary communications system 100 implemented in accordance with an exemplary embodiment. Communications system 100 includes a plurality of routers (router 1 102, router 2 104, router 3 106, router 4 108, router 5 110, router 6 112), and a plurality of customer premises equipment (CPE)/user devices (CPE/user device 1 114, CPE/user device 2 116, CPE/user device 3 118, CPE/user device 4 120), coupled together as shown in FIG. 1. Router 1 102 and router 104 are part of a core network 122. Router 3 and router 4 are part of a backbone network 124. Router 5 110 and router 6 112 are part of stub network 126.

Router 1 102 is coupled to router 3 106 via link bundle B1 128. Router 2 104 is coupled to router 4 108 via link bundle B2 130. Router 1 102 is coupled to router 2 104 via link bundle B3 132. Router 1 102 is coupled to router 5 110 via link bundle B4 134. Router 2 104 is coupled to router 6 112 via link bundle B5 136. Router 3 106 is coupled to router 4 108 via link bundle B6 138. Router 5 110 is coupled to router 6 112 via link bundle B7 140.

In FIG. 1, each line in an illustrated link bundle (B1, B2, B3, B4, B5, B6) represents multiple physical connections, e.g., one line in link bundle B1 128 represents 3 physical connections between router 1 102 and router 3 106.

CPE/user device 1 114 is coupled to router 3 106 via link 142. CPE/user device 2 116 is coupled to router 4 108 via link 144. CPE/user device 3 118 is coupled to router 5 110 via link 146. CPE/user device 4 120 is coupled to router 6 108 via link 148.

The example of FIG. 1 corresponds to failure free operation in which each of the routers are advertising normal link metrics (NLM). Corresponding to each of the link bundles (B1 128, B2 130, B3 132, B4 134, B5 136, B6 138, B7 140), the following normal link metric values are advertised (NLM=2, NLM=2, NLM=1, NLM=2, NLM=2, NLM=1, NLM=1). In addition, the normal link metric values for links (142, 144, 146, 148) are (NLM=1, NLM=1, NLM=1, NLM=1), respectively.

Figure 2:
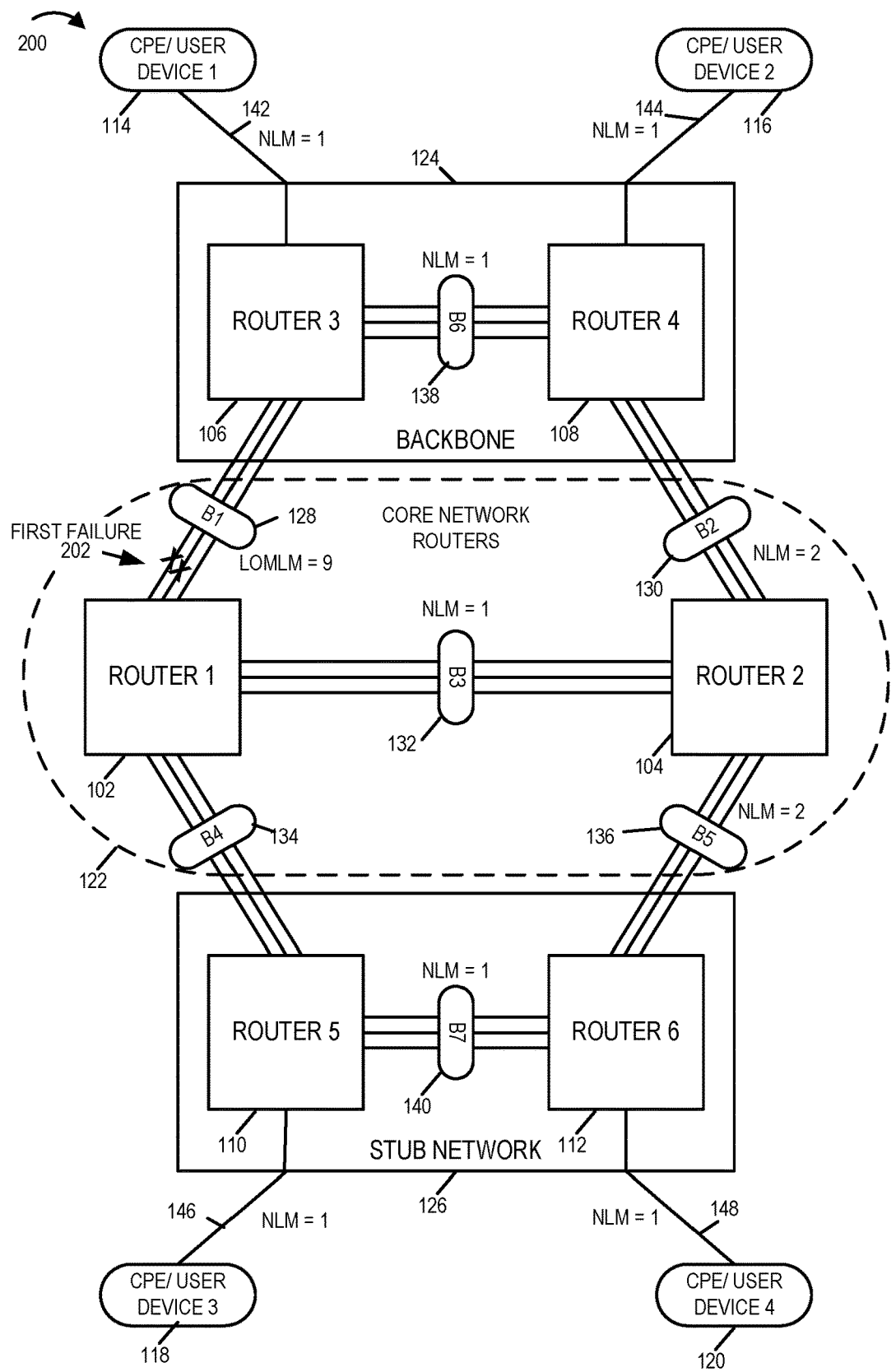
FIG. 2 illustrates the exemplary communications system of FIG. 1 in which a first failure has occurred and a limited operation mode link metric is being advertised corresponding to link bundle 1.

FIG. 2 is a drawing 200 illustrating the exemplary communications system of FIG. 1 in which a first failure has occurred, as indicated by the Xs 202, and a limited operation mode link metric (LOMLM), with a value equal to 9, is now being advertised corresponding to link bundle B1 128.

Figure 3:
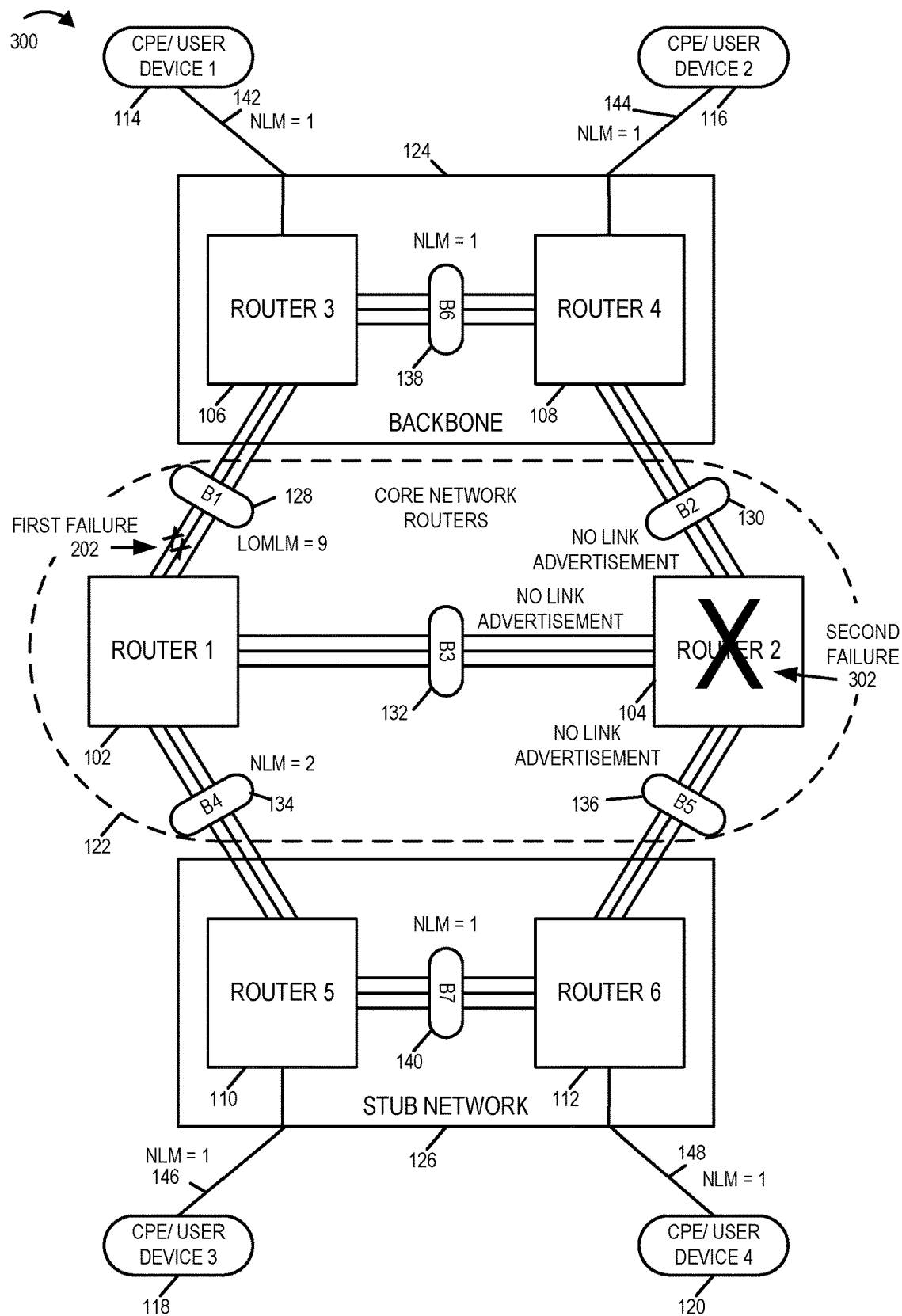
FIG. 3 illustrates the exemplary communications system of FIG. 1, in which a first failure has occurred and a limited operation mode link metric is being advertised corresponding to link bundle 1; and in which a second failure has occurred and link metrics are not being advertised for link bundles 2, 3, and 5.

FIG. 3 is a drawing 300 illustrating exemplary communications system of FIG. 1, in which a first failure has occurred, as indicated by the Xs 202, and a limited operation mode link metric (LOMLM), with a value equal to 9, is now being advertised corresponding to link bundle B1 128. The example of FIG. 3 further illustrates that a second failure has occurred, which is router 2 104 has failed, as indicated by the large X 302 on router 104, and router 2 104 does not have any good links, and as a result link metrics are not being advertised, e.g., from router 2 104, for link bundles B2 130, B3 132, and B5 136. Assuming that both sides have noticed the failure on each link for link bundle B2 130, neither router 2 104 nor router 4 108 will advertise a link metric for link bundle B2 130. Assuming that both sides have noticed the failure on each link for link bundle B3 132, neither router 2 104 nor router 1 102 will advertise a link metric for link bundle B3 132. Assuming that both sides have noticed the failure on each link for link bundle B5 136, neither router 2 104 nor router 6 112 will advertise a link metric for link bundle B5 136.

Figure 4:
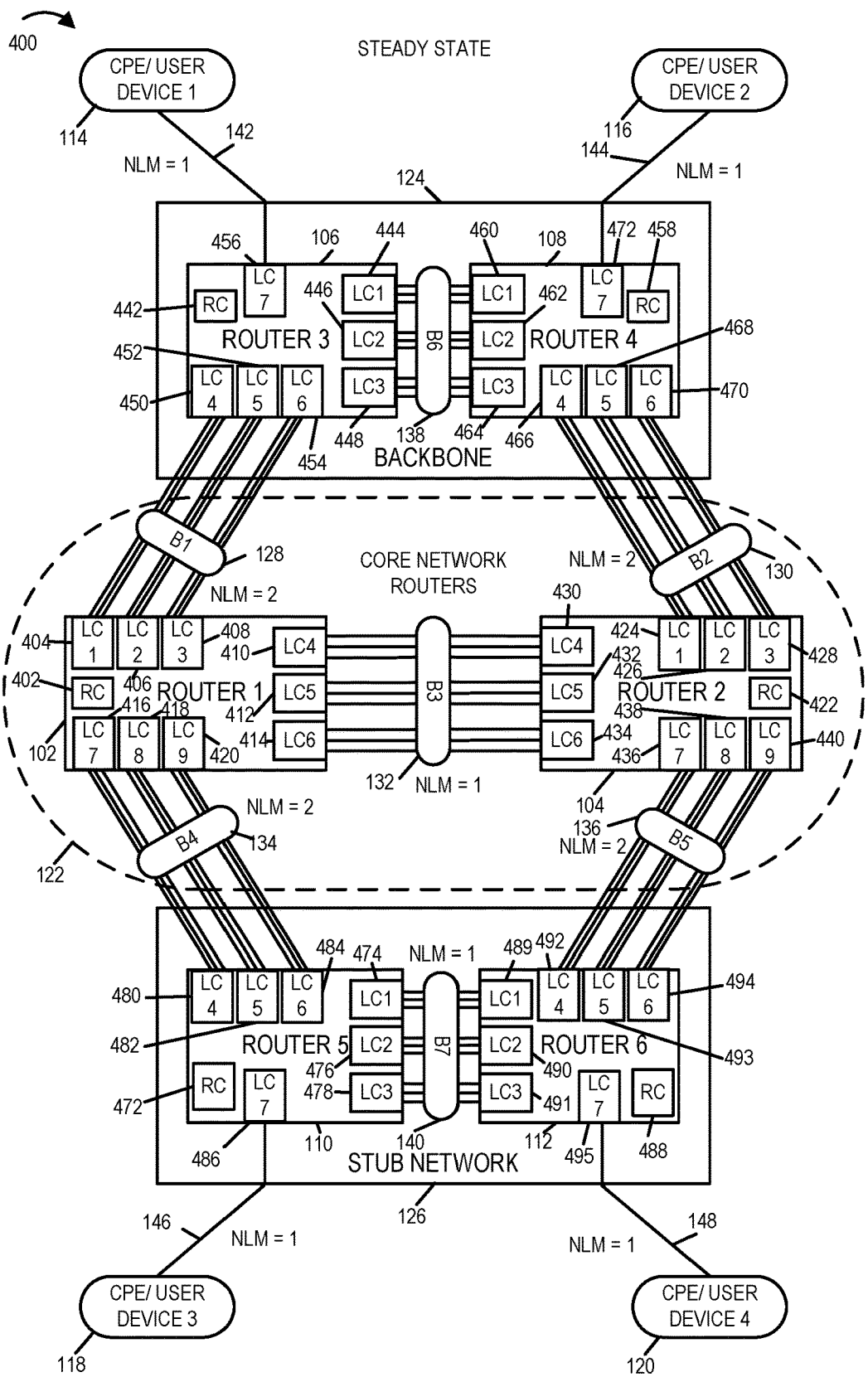
FIG. 4 is a more detailed representation of the FIG. 1 example, which illustrates routing controllers in each of the routers, and further illustrates line cards in each of the routers.

FIG. 4 is drawing 400 which is a more detailed representation of the system 100 of FIG. 1. Drawing 400 illustrates that each of the routers (router 1 102, router 2 104, router 3 106, router 4 108, router 5 110, router 6 112) includes a routing controller (RC 402, RC 422, RC 442, RC 458, RC 472, RC 488), respectively. Each router (102, 104, 106, 108, 110, 112) further includes a plurality of line cards (LCs).

Router 1 102 includes LC1 404, LC2 406, LC3 408, LC4 410, LC5 412, LC6 414, LC7 416, LC8 418, LC9 420. Router 2 104 includes LC1 424, LC2 426, LC3 428, LC4 430, LC5 432, LC6 434, LC7 436, LC8 438, LC9 430.

Router 3 106 includes LC1 444, LC2 446, LC3 448, LC4 450, LC5 452, LC6 454, LC7 456. Router 4 108 includes LC1 460, LC2 462, LC3 464, LC4 466, LC5 468, LC6 470, LC7 472.

Router 5 110 includes LC1 474, LC2 476, LC3 478, LC4 480, LC5 482, LC6 484, LC7 486. Router 6 112 includes LC1 489, LC2 490, LC3 491, LC4 492, LC5 493, LC6 494, LC7 495.

In this example, each bundle (B1, B2, B3, B4, B5, B6, B7), includes 9 physical connections, between two routers, with there being 3 connections per pair of line cards. For example, corresponding to bundle B1 128, there are three physical connections between LC1 404 of router 1 102 and LC4 450 of router 3 106; there are three physical connections between LC2 406 of router 1 102 and LC5 452 of router 3 106; and there are three physical connections between LC3 408 of router 1 102 and LC6 454 of router 3 106. Although there are 9 physical connections between router 1 102 and router 3 106, which are part of link bundle B 128, a single metric, which in this example is NLM=2, is advertised for the link bundle B1 128.

Figure 5:
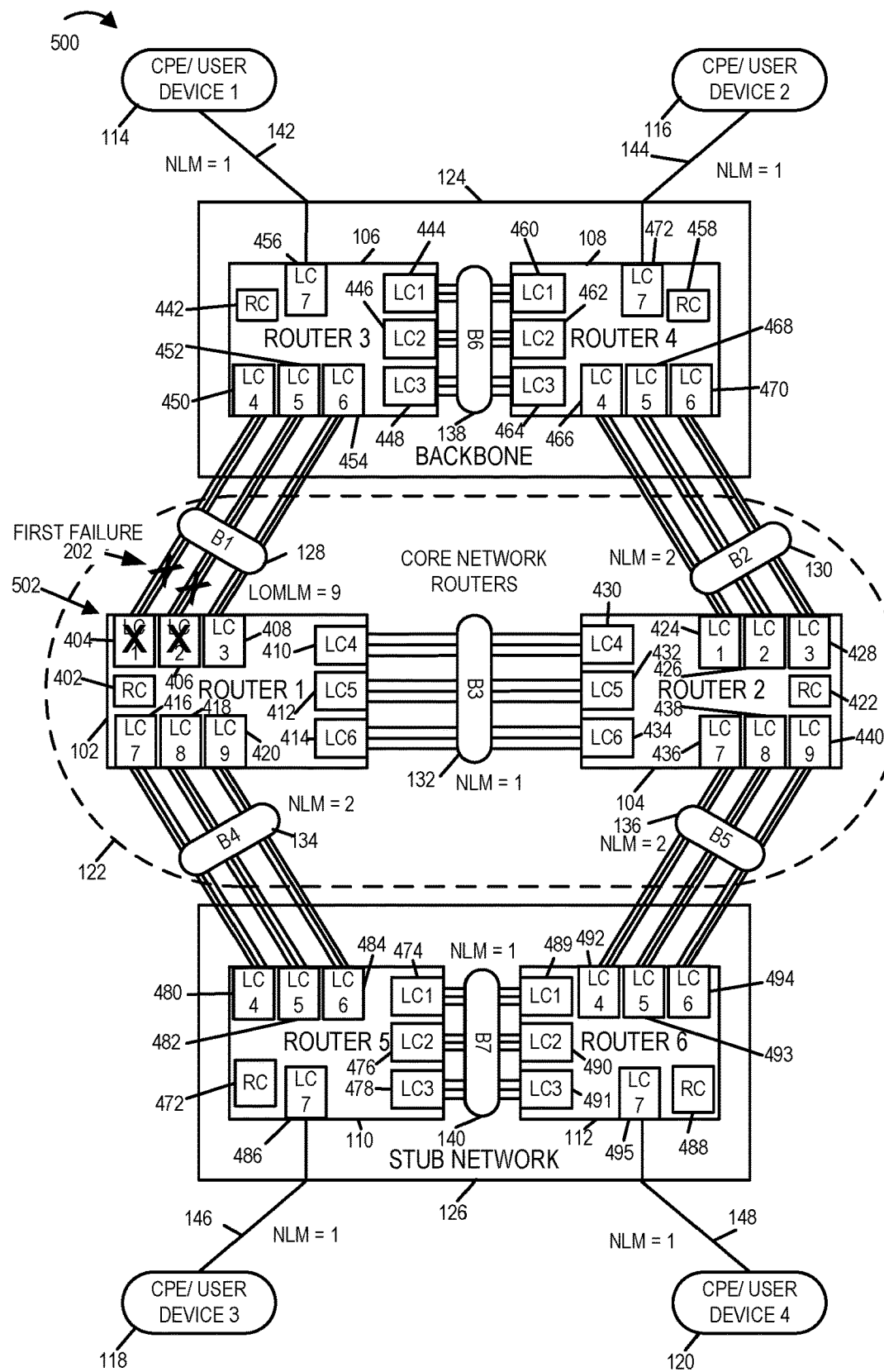
FIG. 5 is a more detailed representation of FIG. 2 example, which illustrates that line cards (line card 1 and line card 2) in router 1 have failed resulting in the first failure and the advertising of the limited operation mode link metric for the logical link corresponding to link bundle 1.

FIG. 5 is drawing 500 which is a more detailed representation of FIG. 2 example, which includes the routing controllers and line cards as already shown and described with respect to FIG. 4. Drawing 500 of FIG. 5 further illustrates that line cards (line card 1 (LC1) 404, and line card 2 (LC2)

406 in router 1 102 have failed, as indicted by the Xs 502 on LC1 404 and LC2 406, resulting in the first failure 202 and the advertising of the limited operation mode link metric (LOMLM)=9 for the logical link corresponding to link bundle B1 128.

In this exemplary embodiment, if the number of good links in link bundle B1 is in the range {4 . . . 9}, then the normal link metric (NLM), with value=2 is advertised; however, if the number of good links in the link bundle B1 is in the range {1 . . . 3} then the limited operation mode link metric (LOMLM), with value=9 is advertised; and if no links in the link bundle B1 are good then a link metric is not advertised for the link bundle B1. In this example, 3 links are good, which correspond to line card LC3 408; therefore router 1 102 advertised LOMLM=9 corresponding to link bundle B1 128.

Figure 6:
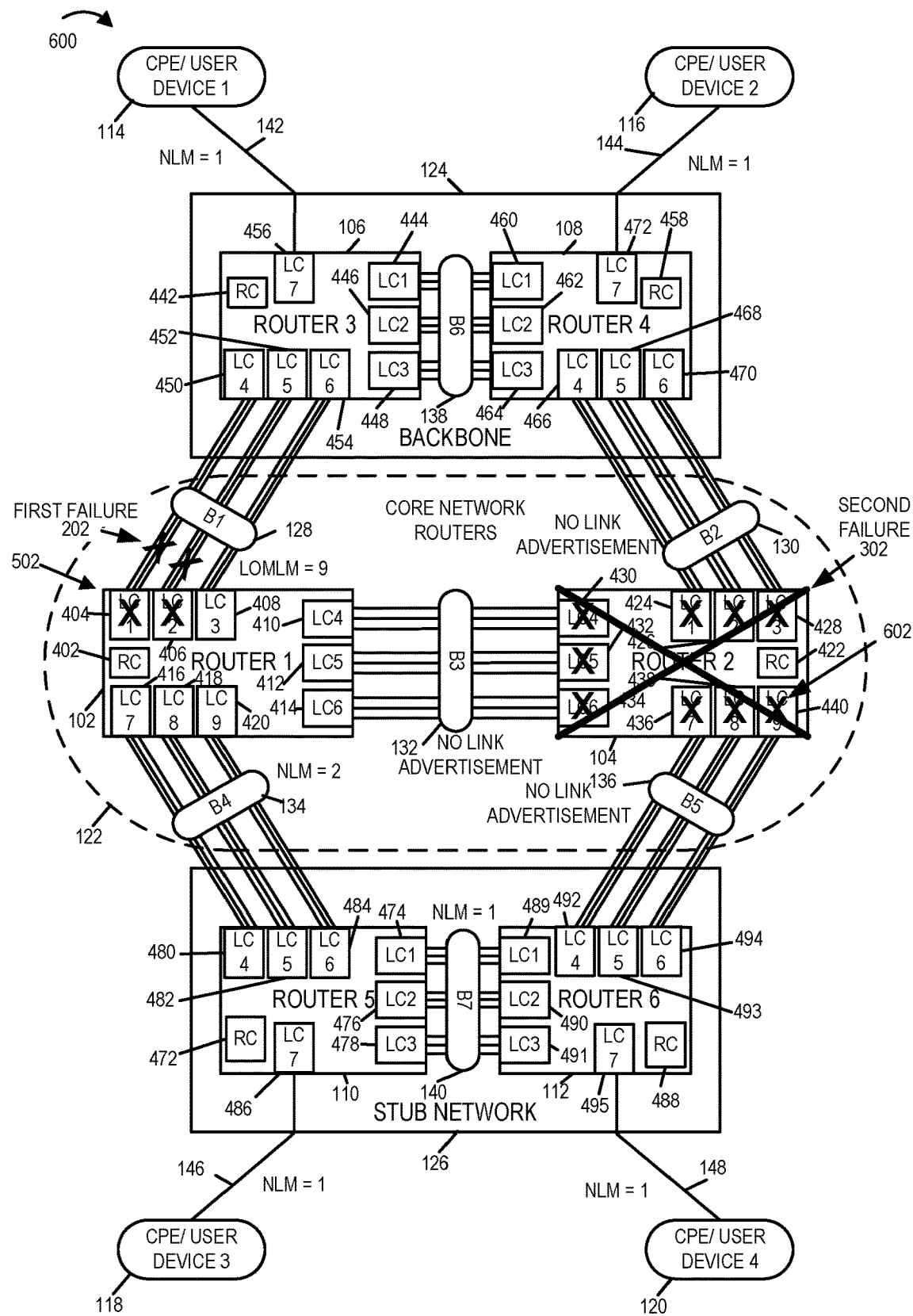
FIG. 6 is a more detailed representation of FIG. 3 example, which illustrates that line cards (line card 1 and line card 2) in router 1 have failed resulting in the first failure and the advertising of the limited operation mode link metric for the logical link corresponding to link bundle 1; and further illustrates the each of the line cards in router 2 are failing, resulting in 0 good links from router 2, and as a result link metrics are not advertised corresponding to link bundles 2, 3 and 5.

FIG. 6 is a drawing 600 which is more detailed representation of FIG. 3 example, which includes the routing controllers and line cards as already shown and described with respect to FIG. 4 and FIG. 5. Drawing 600 of FIG. 6 further illustrates that line cards line card 1 (LC1) 404, and line card 2 (LC2) 406 in router 1 102 have failed, as indicted by the Xs 502 on LC1 404 and LC2 406, resulting in the first failure 202 and the advertising of the limited operation mode link metric (LOMLM)=9 for the logical link corresponding to link bundle B1 128. Drawing 600 further illustrates that router 2 104 is experiencing a major failure, as indicated by large X 302 over router 2 104. Drawing 600 of FIG. 6 further illustrates the each of the line cards (LC 1 424, LC2 426, LC3 428, LC4 430, LC5 432, LC6 434, LC7 436, LC8 438, LC9 440) in router 2 104 are failing, as indicated by small Xs 602 on each of LCs (424, 426, 428, 430, 432, 434, 436, 438, 440), resulting in 0 good links from router 2 302, and as a result link metrics are not advertised corresponding to link bundles B2 130, B3 132 and B5 136.

Figure 7A:
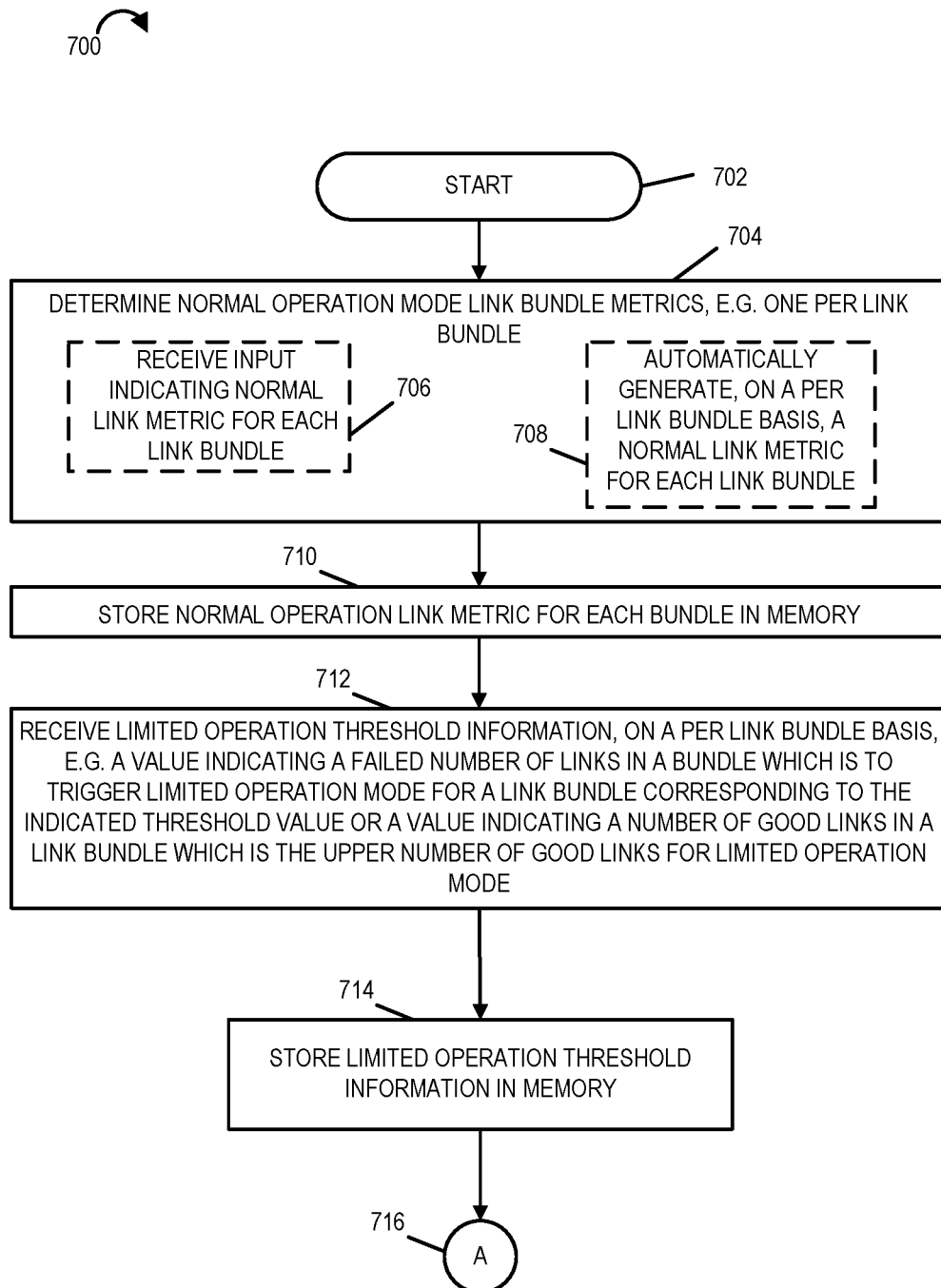
FIG. 7A is a first part of a flowchart of an exemplary method of operating a node, e.g., a router, in accordance with an exemplary embodiment.
Figure 7B:
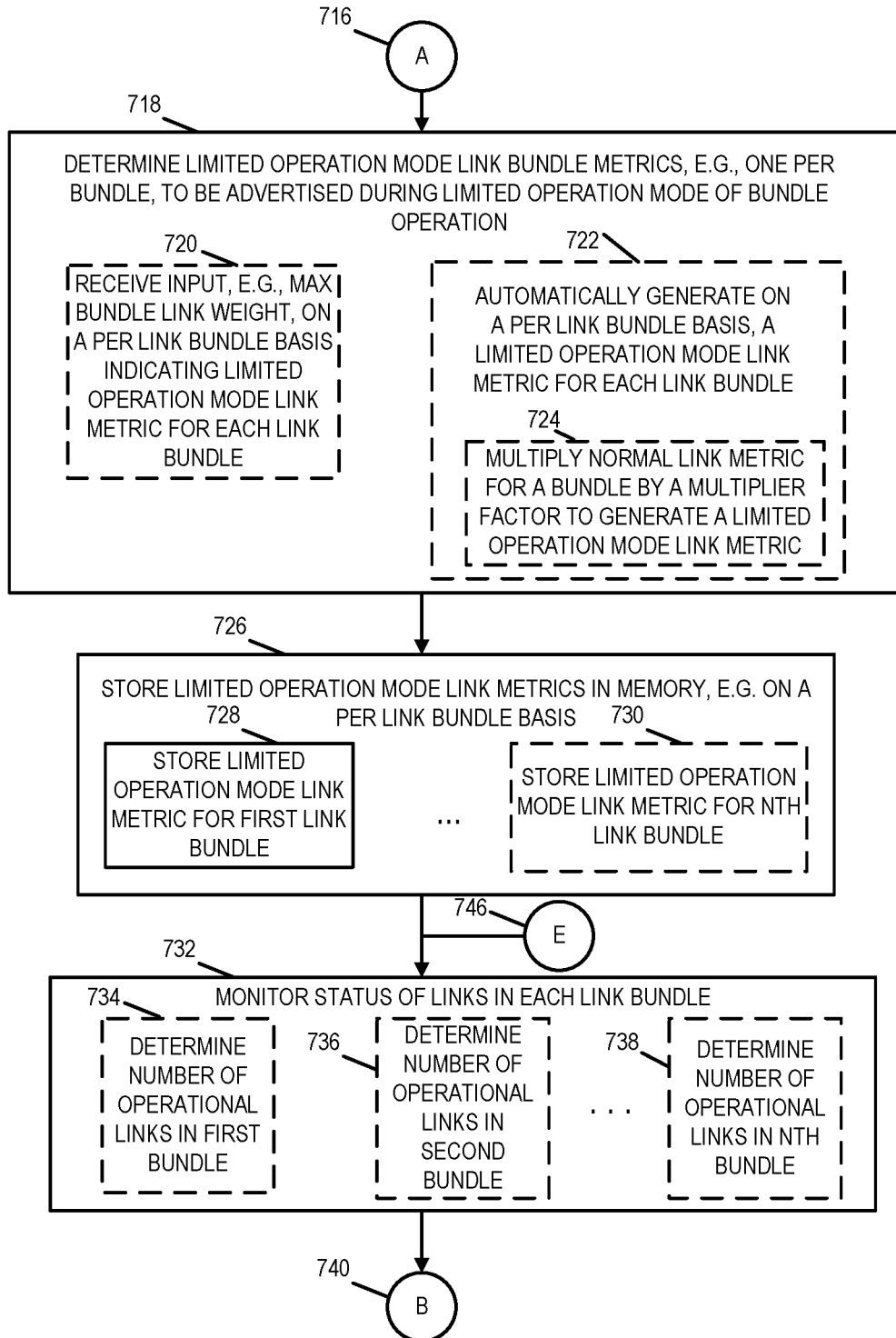
FIG. 7B is a second part of a flowchart of an exemplary method of operating a node, e.g., a router, in accordance with an exemplary embodiment.
Figure 7C:
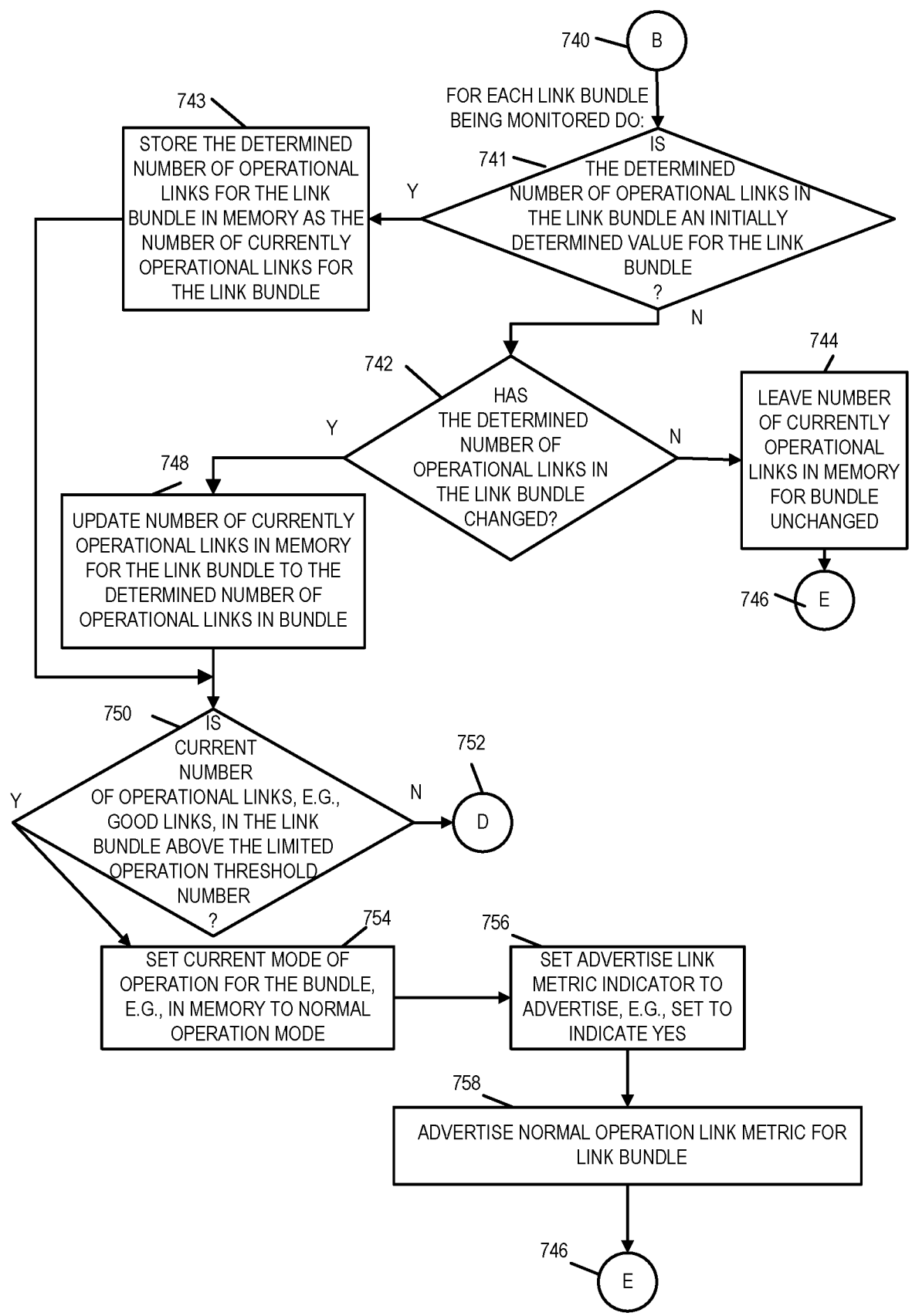
FIG. 7C is a third part of a flowchart of an exemplary method of operating a node, e.g., a router, in accordance with an exemplary embodiment.
Figures 7, 7A, 7B, 7C, 7D:
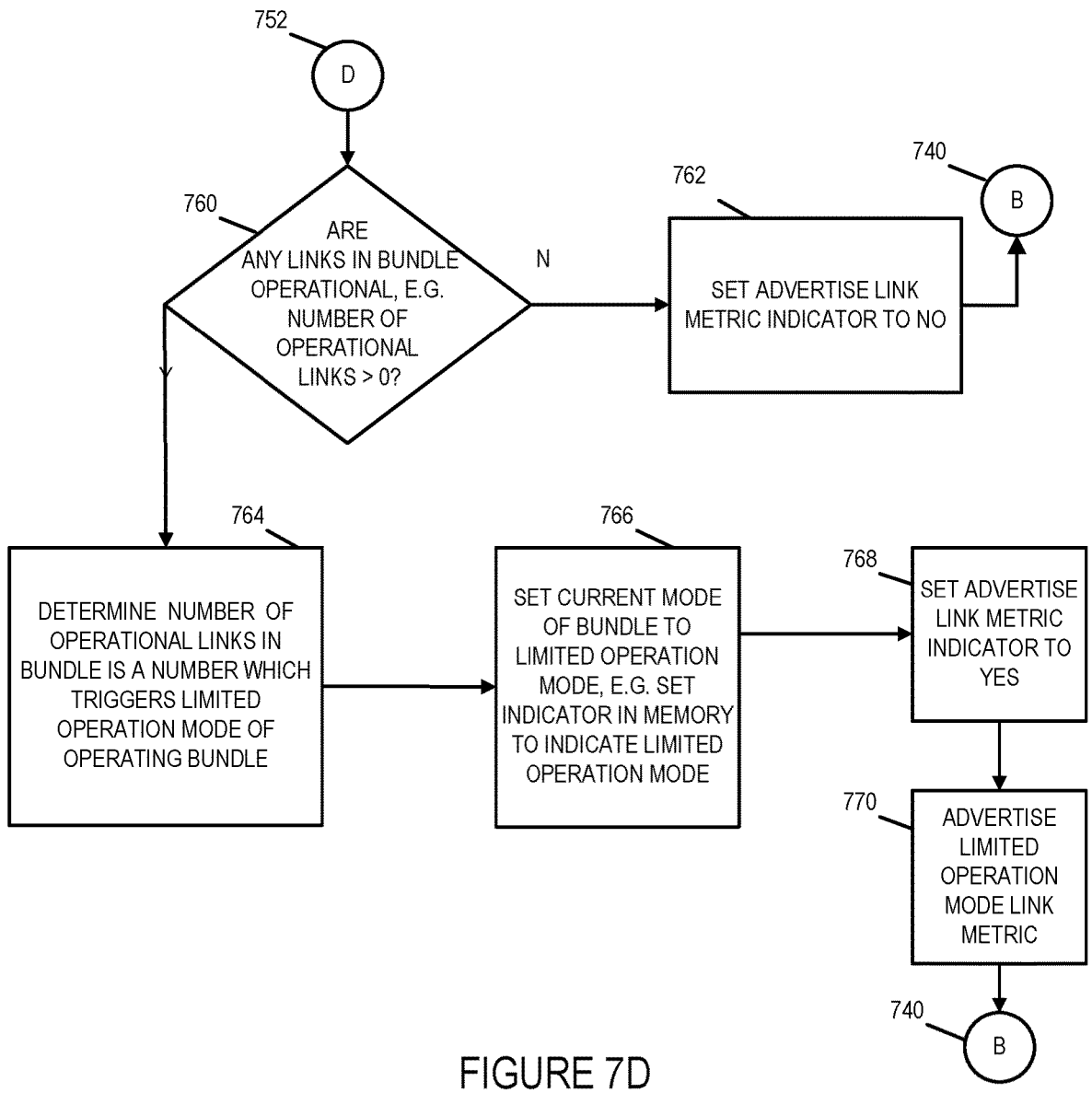
FIG. 7 comprises the combination of FIG. 7A, FIG. 7B, FIG. 7C and FIG. 7D.

FIG. 7, comprising the combination of FIG. 7A, FIG. 7B, FIG. 7C and FIG. 7D, is a flowchart 700 of an exemplary method of operating a node, e.g., a router, in a communications network in accordance with an exemplary embodiment. The node implementing the method of flowchart 700 is, e.g., one of the routers (router 1 102, router 2 104, router 3 106, router 4 108, router 5 106, router 6 106) of system 100 of FIGS. 1-6.

Operation of the exemplary method starts in step 702, in which the node is powered on and initialized. Operation proceeds from start step 702 to step 704. In step 704 the node determines normal operation mode link bundle metrics, e.g., one per link bundle. In some embodiments, step 704 includes step 706 in which the node receives input indicating a normal link metric for each link bundle. In some embodiments, step 704 includes step 708 in which the node automatically generates, on a per link bundle basis, a normal link metric for each link bundle. Operation proceeds from step 704 to step 710.

In step 710 the node stores the normal operation link metric for each link bundle in memory. Operation proceeds from step 710 to step 712.

In step 712 the node received limited operation threshold information, on a per link bundle basis, e.g., a value, e.g., a threshold value, indicating a failed number of links in a bundle which is used to trigger limited operation mode for a link bundle corresponding to the indicated threshold value or a value, e.g., a threshold value, indicating a number of good links in a link bundle which is the upper number of good links for limited operation mode. In some embodiments, the limited operation threshold information for a link bundle is a limited operation threshold number for the link bundle, which indicates the upper limit number of operational links for which the node will be operated in limited operation mode with regard to the link bundle, and if the number of operational links is above the limited operation threshold number the node will operate in normal mode with regard to the link bundle. In some embodiments, the total number of links in the link bundle is known to the node, and therefore a limited operation threshold number, which indicates the upper limit number of operational links for which the node will be operated in limited operation mode with regard to the link bundle, also indicates a failed number of links in the bundle used to trigger limited operation mode for the link bundle. Operation proceeds from step 712 to step 714, in which the node stores the limited operation threshold information in memory. Operation proceeds from step 714, via connecting node A 716, to step 718.

In step 718 the node determines limited operation mode link bundle metrics, e.g., one per link bundle, to be advertised during limited operation mode of bundle operation. In some embodiments, step 718 includes step 720 in which the node receives input, e.g., a max bundle link weight, on a per link bundle basis, indicating a limited operation mode link metric (LOMLM) value for each link bundle. In some embodiments, step 718 includes step 722 in which the node automatically generates, on a per link bundle basis, a limited operation mode link metric for each link bundle. In some embodiments, step 722 includes step 724 in which the node multiplies a normal link metric for a link bundle by a multiplier factor, e.g., a multiplier factor greater than 1, to generate a limited operation mode link metric for the link bundle. Operation proceeds from step 718 to step 726.

In step 726 the node stores the limited operation mode link metrics in memory, e.g., on a per link bundle basis. Step 726 includes step 728 in which the node stores the limited operation mode link metric for the first link bundle. In some embodiments, step 726 includes step 730 in which the node stores the limited operation mode link metric for the Nth link bundle. Operation proceeds from step 726 to step 732.

In step 732 the node monitors the status of links in each bundle. Step 732 includes step 734 and may include step 736 and step 738, depending upon the number of bundles. In step 734 the node determines the number of operational links in the first link bundle. In step 736 the node determines the number of operational links in the second link bundle. In step 738 the node determines the number of operational links in the Nth link bundle. Operation proceeds from step 732, via connecting node B 740, to step 741, e.g., for each bundle being monitored. Thus the flowchart portions of FIGS. 7C and 7D may be, and sometimes are, executed, e.g., in parallel, for each of the N bundles being monitored.

In step 741 the node determines if the determined number of operational links in the link bundle, e.g., from one of steps 734, 736, . . . , 738, is an initially determined value for the link bundle. If the determined number of operational links for the link bundle is an initially determined value, e.g., a value obtained from a first pass of one of steps 734, 736, . . . , 738, then operation proceeds from step 741 to step 743; otherwise, operation proceeds from step 741 to step 742.

In step 743 the node stores the determined number of operational links, e.g., good links, for the link bundle in memory as the number of currently operational links for the link bundle. Operation proceeds from step 743 to step 750.

In step 742, the node determines if the determined number of operational links in the link bundle has changed, e.g., where the link bundle is one of N link bundles being monitored, e.g., the 1st link bundle, second link bundle, . . . , or Nth link bundle. In some embodiments, in step 742 the node compares the value determined in the most recent iteration of one of steps 734, 736, . . . , 738, to the value stored in memory for the number of currently operational links for the link bundle, which represents the value from the second most recent iteration of one of steps 734, 736, . . . , and 738. If the determined number of operational links has not changed, e.g., the status of the link bundle has not changed, then operation proceeds from step 742 to step 744 in which the node leaves the number of currently operation link in memory for each of the bundles unchanged. Operation proceeds from step 744, via connecting node E 746, to step 732. However, if the determined number of operational links in the link bundle has changed, e.g., the status of the link bundle has changed, then operation proceeds from step 742 to step 748 in which the node updates the number of currently operational links in memory for the bundle to the most recently determined number of operational links in the bundle. Operation proceeds from step 748 to step 750.

In step 750 the node determines if the current number of operational links, e.g., good links, in the bundle is above the limited operation threshold number for the link bundle. In one example, there are 9 links in a link bundle and the limited operation threshold number is three. In some embodiments, the limited operation threshold number is a function of the number of links in the link bundle, e.g., a rounded integer which is a fractional percentage of the number of links in the link bundle, said fractional percentage being less than ½. If the determination that the number of good links is above, the limited operation threshold number, then operation proceeds from step 750 to step 754, in which the node sets the current mode of operation for the link bundle, e.g. in memory, to normal operation mode. Operation proceeds from step 754 to step 756 in which the node sets an advertise link metric indicator to advertise, e.g., sets the advertise link metric indicator to indicate yes. In some embodiments an advertise link metric indicator value of 1 indicates yes which signifies advertise. Operation proceeds from step 756 to step 758. In step 758 the node advertises the normal operation link metric for the link bundle. In some embodiments, step 758 includes operating a transmitter in the node to transmit the normal link metric for the link bundle. Operation proceeds from step 758, via connecting node E 746, to step 732.

Returning to step 750, in step 750 if the determination is that the number of operational links, e.g., good links, in the link bundle is not above the limited operation threshold number, then operation proceeds from step 750, via connecting node D 752, to step 760.

In step 760 the node determines if there are any links in the link bundle which are operational, e.g., is the number of operational links in the link bundle greater than zero. If the determination of step 760 is that there are no operational links in the link bundle, then operation proceeds from step 760 to step 762, in which the node sets the advertise link metric indicator to no, e.g., indicating that there will be no advertisement for this link bundle. In some embodiments an advertise link metric indicator value of 0 indicates no which signifies do not advertise. In various embodiments, when the advertise link metric indicator corresponding to a link bundle is set to no, the node is operated to control the node to refrain from transmitting a link metric corresponding to the link bundle. Operation proceeds from step 762, via connecting node B 740, to step 742, where the status of this link bundle is checked at a later point in time.

Returning to step 760, if the determination of step 760 is that there is at least one operational link in the link bundle, then operation proceeds from step 760 to step 764. In step 764 the node determines that the number of operational links in the link bundle is a number which triggers limited operation mode with regard to operating the link bundle. In one example, there are 9 links in a link bundle, and if determined that the number of operational links in the link bundle is any of: 1, 2 or 3, then limited operational mode is triggered. Operation proceeds from step 764 to step 766.

In step 766 the node sets the current mode of the link bundle to limited operation mode, e.g., sets an indicator in memory to indicate limited operation mode. Operation proceeds from step 766 to step 768.

In step 768 the node set the advertise link metric indicator to yes, indicating that a link metric will be advertised for the link bundle. Operation proceeds from step 768 to step 770, in which the node advertises the limited operation mode link metric (LOMLM) for the link bundle. In some embodiments, step 770 includes operating a transmitter in the node to transmit the limited operation mode link metric for the link bundle. Operation proceeds from step 770, via connecting node B 749, to step 742, where the status of this link bundle is checked at a later point in time.

Figure 8:
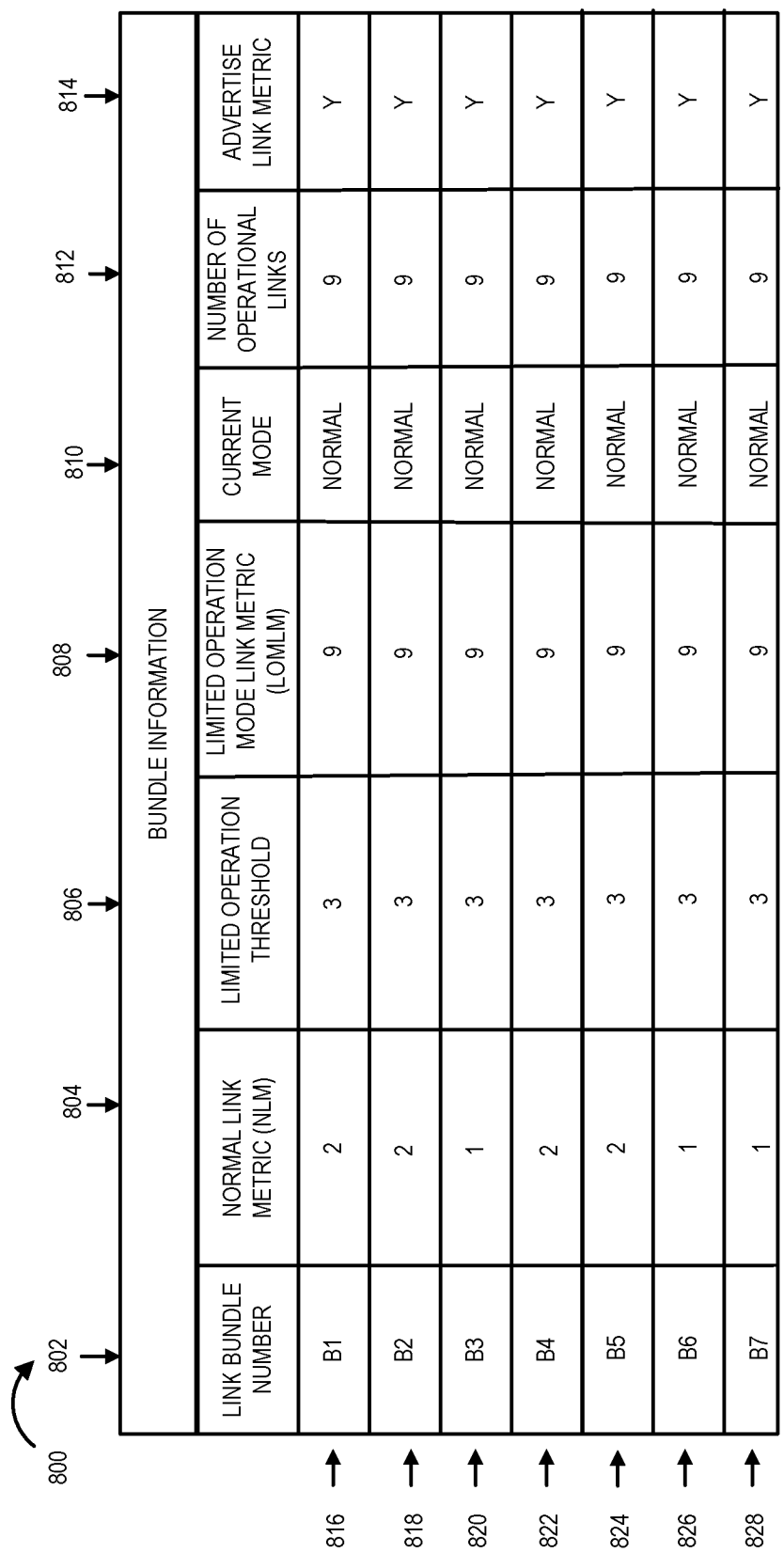
FIG. 8 is a drawing of a table illustrating exemplary link bundle information corresponding to the example of FIG. 1 and FIG. 4.

FIG. 8 is a drawing of a table 800 illustrating exemplary link bundle information corresponding to the example of FIG. 1 and FIG. 4. First column 802 includes link bundle number information used to identify each of the links bundles. Second column 804 includes a normal link metric (NLM) value for each of the link bundles. Third column 806 includes a limited operation threshold value for each of the link bundles. Fourth column 808 includes a limited operation mode link metric (LOMLM) value for each of the link bundles. Fifth column 810 lists a current mode for each of the link bundles. Sixth column 812 lists the number of operation links for each of the link bundles, and seventh column 814 lists whether or not a link metric is advertised, e.g., whether or not one of NLM or LOMLM, is advertised, for the link bundle.

First row 816 indicates that link bundle B1 has a NLM=2, a limited operation threshold=3, a LOMLM=9, is in normal mode, currently has 9 operational links, and the advertising link metric is set to yes. The information in first row 816 is, e.g., included in router 1 102 and router 3 106. Each of router 1 102 and router 3 106 advertise NLM=2 for link bundle B1 128.

Second row 818 indicates that link bundle B2 has a NLM=2, a limited operation threshold=3, a LOMLM=9, is in normal mode, currently has 9 operational links, and the advertising link metric is set to yes. The information in second row 818 is, e.g., included in router 2 104 and router 4 108. Each of router 2 104 and router 4 108 advertise NLM=2 for link bundle B2 130.

Third row 820 indicates that link bundle B3 has a NLM=1, a limited operation threshold=3, a LOMLM=9, is in normal mode, currently has 9 operational links, and the advertising link metric is set to yes. The information in third row 820 is, e.g., included in router 1 102 and router 2 104. Each of router 1 102 and router 2 104 advertise NLM=1 for link bundle B3 132.

Fourth row 822 indicates that link bundle B4 has a NLM=2, a limited operation threshold=3, a LOMLM=9, is in normal mode, currently has 9 operational links, and the advertising link metric is set to yes. The information in fourth row 822 is, e.g., included in router 1 102 and router 5 110. Each of router 1 102 and router 5 110 advertise NLM=2 for link bundle B4 134.

Fifth row 824 indicates that link bundle B5 has a NLM=2, a limited operation threshold=3, a LOMLM=9, is in normal mode, currently has 9 operational links, and the advertising link metric is set to yes. The information in fifth row 824 is, e.g., included in router 2 104 and router 6 112. Each of router 2 104 and router 6 112 advertise NLM=2 for link bundle B5 136.

Sixth row 826 indicates that link bundle B6 has a NLM=1, a limited operation threshold=3, a LOMLM=9, is in normal mode, currently has 9 operational links, and the advertising link metric is set to yes. The information in sixth row 826 is, e.g., included in router 3 106 and router 4 108. Each of router 3 106 and router 4 108 advertise NLM=1 for link bundle B6 138.

Seventh row 828 indicates that link bundle B7 has a NLM=1, a limited operation threshold=3, a LOMLM=9, is in normal mode, currently has 9 operational links, and the advertising link metric is set to yes. The information in seventh row 828 is, e.g., included in router 5 110 and router 6 112. Each of router 5 110 and router 6 112 advertise NLM=1 for link bundle B7 140.

Figure 9:
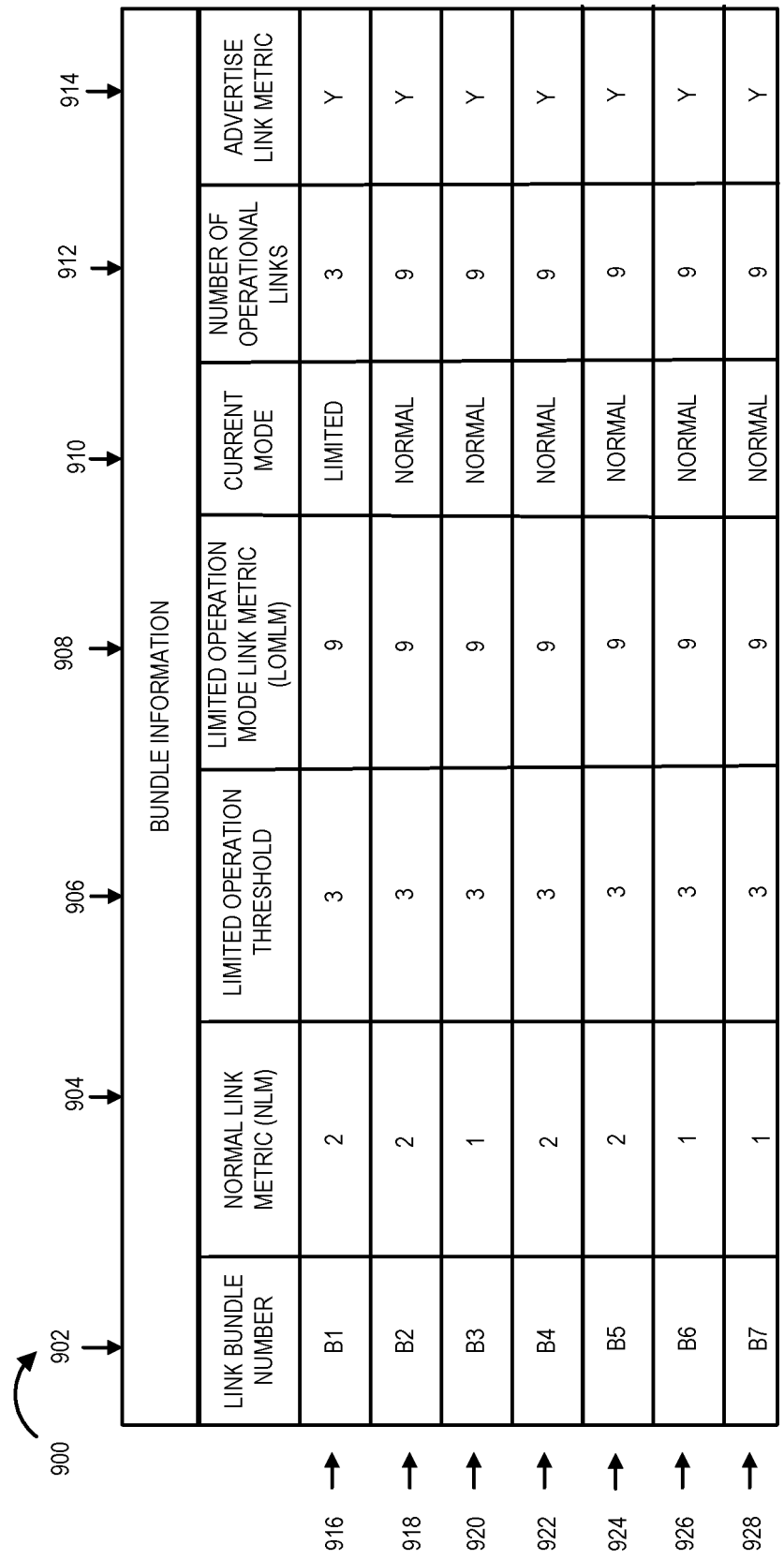
FIG. 9 is a drawing of a table illustrating exemplary link bundle information corresponding to the example of FIG. 2 and FIG. 5.

FIG. 9 is a drawing of a table 900 illustrating exemplary link bundle information corresponding to the example of FIG. 2 and FIG. 5. First column 902 includes link bundle number information used to identify each of the links bundles. Second column 904 includes a normal link metric (NLM) value for each of the link bundles. Third column 906 includes a limited operation threshold value for each of the link bundles. Fourth column 908 includes a limited operation mode link metric (LOMLM) value for each of the link bundles. Fifth column 910 lists a current mode for each of the link bundles. Sixth column 912 lists the number of operation links for each of the link bundles, and seventh column 914 lists whether or not a link metric is advertised, e.g., whether or not one of NLM or LOMLM, is advertised, for the link bundle.

First row 916 indicates that link bundle B has a NLM=2, a limited operation threshold=3, a LOMLM=9, is in limited operation mode, currently has 3 operational links, and the advertising link metric is set to yes. The information in first row 916 is, e.g., included in router 1 102 and router 3 106. Each of router 1 102 and router 3 106 advertise LOMLM=9 for link bundle B1 128.

Second row 918 indicates that link bundle B2 has a NLM=2, a limited operation threshold=3, a LOMLM=9, is in normal mode, currently has 9 operational links, and the advertising link metric is set to yes. The information in second row 918 is, e.g., included in router 2 104 and router 4 108. Each of router 2 104 and router 4 108 advertise NLM=2 for link bundle B2 130.

Third row 920 indicates that link bundle B3 has a NLM=1, a limited operation threshold=3, a LOMLM=9, is in normal mode, currently has 9 operational links, and the advertising link metric is set to yes. The information in third row 920 is, e.g., included in router 1 102 and router 2 104. Each of router 1 102 and router 2 104 advertise NLM=1 for link bundle B3 132.

Fourth row 922 indicates that link bundle B4 has a NLM=2, a limited operation threshold=3, a LOMLM=9, is in normal mode, currently has 9 operational links, and the advertising link metric is set to yes. The information in fourth row 922 is, e.g., included in router 1 102 and router 5 110. Each of router 1 102 and router 5 110 advertise NLM=2 for link bundle B4 134.

Fifth row 924 indicates that link bundle B5 has a NLM=2, a limited operation threshold=3, a LOMLM=9, is in normal mode, currently has 9 operational links, and the advertising link metric is set to yes. The information in fifth row 924 is, e.g., included in router 2 104 and router 6 112. Each of router 2 104 and router 6 112 advertise NLM=2 for link bundle B5 136.

Sixth row 926 indicates that link bundle B6: has a NLM=1, a limited operation threshold=3, a LOMLM=9, is in normal mode, currently has 9 operational links, and the advertising link metric is set to yes. The information in sixth row 926 is, e.g., included in router 3 106 and router 4 108. Each of router 3 106 and router 4 108 advertise NLM=1 for link bundle B6 138.

Seventh row 928 indicates that link bundle B7 has a NLM=1, a limited operation threshold=3, a LOMLM=9, is in normal mode, currently has 9 operational links, and the advertising link metric is set to yes. The information in seventh row 928 is, e.g., included in router 5 110 and router 6 112. Each of router 5 110 and router 6 112 advertise NLM=1 for link bundle B7 140.

FIG. 10 is a drawing of a table 1000 illustrating exemplary link bundle information corresponding to the example of FIG. 3 and FIG. 6. First column 1002 includes link bundle number information used to identify each of the links bundles. Second column 1004 includes a normal link metric (NLM) value for each of the link bundles. Third column 1006 includes a limited operation threshold value for each of the link bundles. Fourth column 1008 includes a limited operation mode link metric (LOMLM) value for each of the link bundles. Fifth column 1010 lists a current mode for each of the link bundles. Sixth column 1012 lists the number of operation links for each of the link bundles, and seventh column 1014 lists whether or not a link metric is advertised, e.g., whether or not one of NLM or LOMLM, is advertised, for the link bundle.

First row 1016 indicates that link bundle B1 has a NLM=2, a limited operation threshold=3, a LOMLM=9, is in limited mode, currently has 3 operational links, and the advertising link metric is set to yes. The information in first row 1016 is, e.g., included in router 1 102 and router 3 106. Each of router 1 102 and router 3 106 advertise LOMLM=9 for link bundle B1 128.

Second row 1018 indicates that link bundle B2 has a NLM=2, a limited operation threshold=3, a LOMLM=9, is in down mode, currently has 0 operational links, and the advertising link metric is set to no. The information in second row 1018 is, e.g., included in router 2 104 and router 4 108. Each of router 2 104 and router 4 108 refrains from advertising a link metric for link bundle B2 130.

Third row 1020 indicates that link bundle B3 has a NLM=1, a limited operation threshold=3, a LOMLM=9, is in down mode, currently has 0 operational links, and the advertising link metric is set to no. The information in third row 1020 is, e.g., included in router 1 102 and router 2 104. Each of router 1 102 and router 2 104 refrain from advertising a link metric for link bundle B3 132.

Fourth row 1022 indicates that link bundle B4 has a NLM=2, a limited operation threshold=3, a LOMLM=9, is in normal mode, currently has 9 operational links, and the advertising link metric is set to yes. The information in fourth row 1022 is, e.g., included in router 1 102 and router 5 110. Each of router 1 102 and router 5 110 advertise NLM=2 for link bundle B4 134.

Fifth row 1024 indicates that link bundle B5 has a NLM=2, a limited operation threshold=3, a LOMLM=9, is in down mode, currently has 0 operational links, and the advertising link metric is set to no. The information in fifth row 1024 is, e.g., included in router 2 104 and router 6 112.

Each of router 2 104 and router 6 112 refrain from advertising a link metric for link bundle B5 136.

Sixth row 1026 indicates that link bundle B6 has a NLM=1, a limited operation threshold=3, a LOMLM=9, is in normal mode, currently has 9 operational links, and the advertising link metric is set to yes. The information in sixth row 1026 is, e.g., included in router 3 106 and router 4 108. Each of router 3 106 and router 4 108 advertise NLM=1 for link bundle B6 138.

Seventh row 1028 indicates that link bundle B7 has a NLM=1, a limited operation threshold=3, a LOMLM=9, is in normal mode, currently has 9 operational links, and the advertising link metric is set to yes. The information in seventh row 1028 is, e.g., included in router 5 110 and router 6 112. Each of router 5 110 and router 6 112 advertise NLM=1 for link bundle B7 140.

Figure 11A:
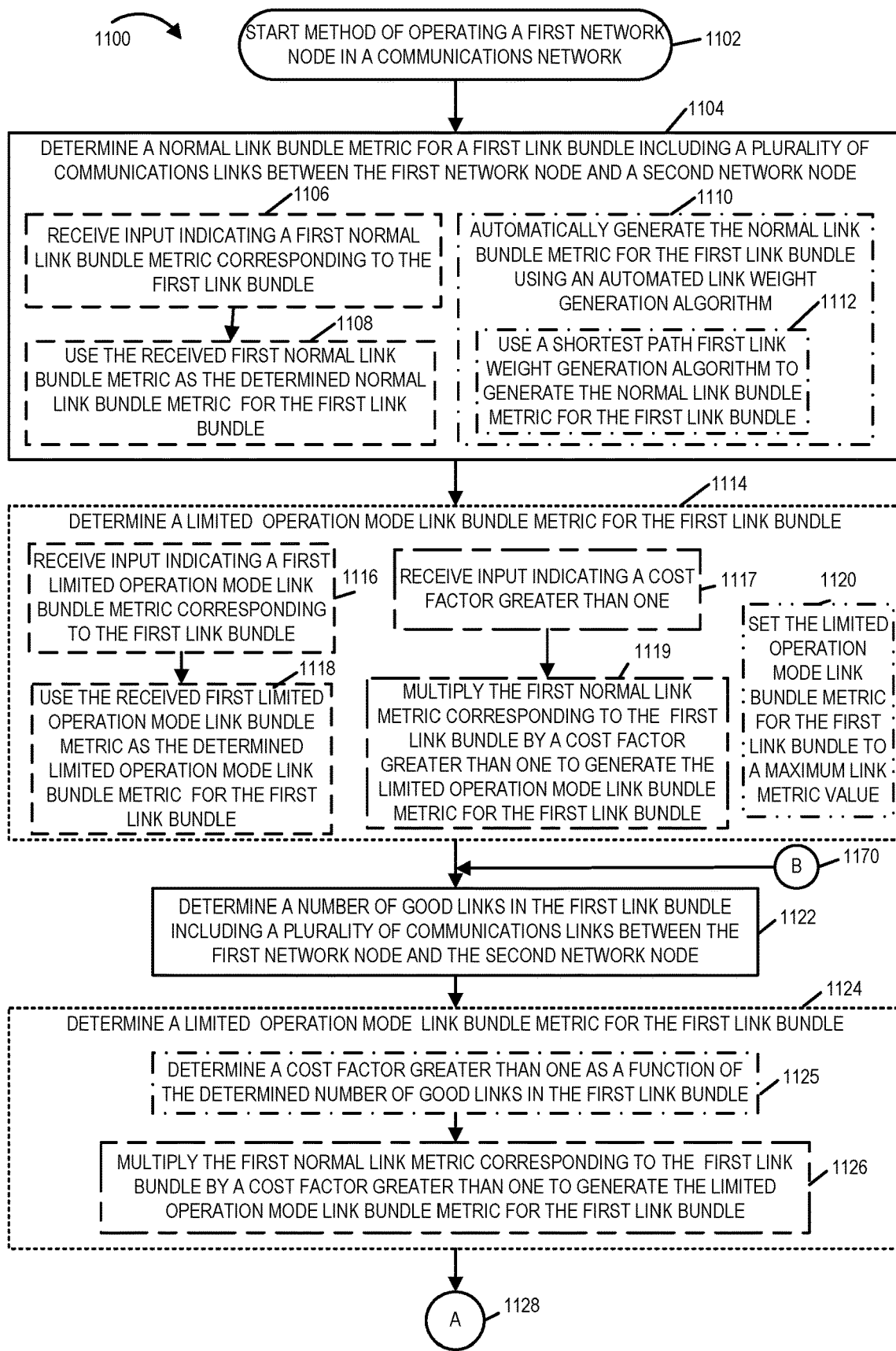
FIG. 11A is a first part of a flowchart of an exemplary method of operating a first node, e.g., a router, in accordance with an exemplary embodiment.
Figure 11B:
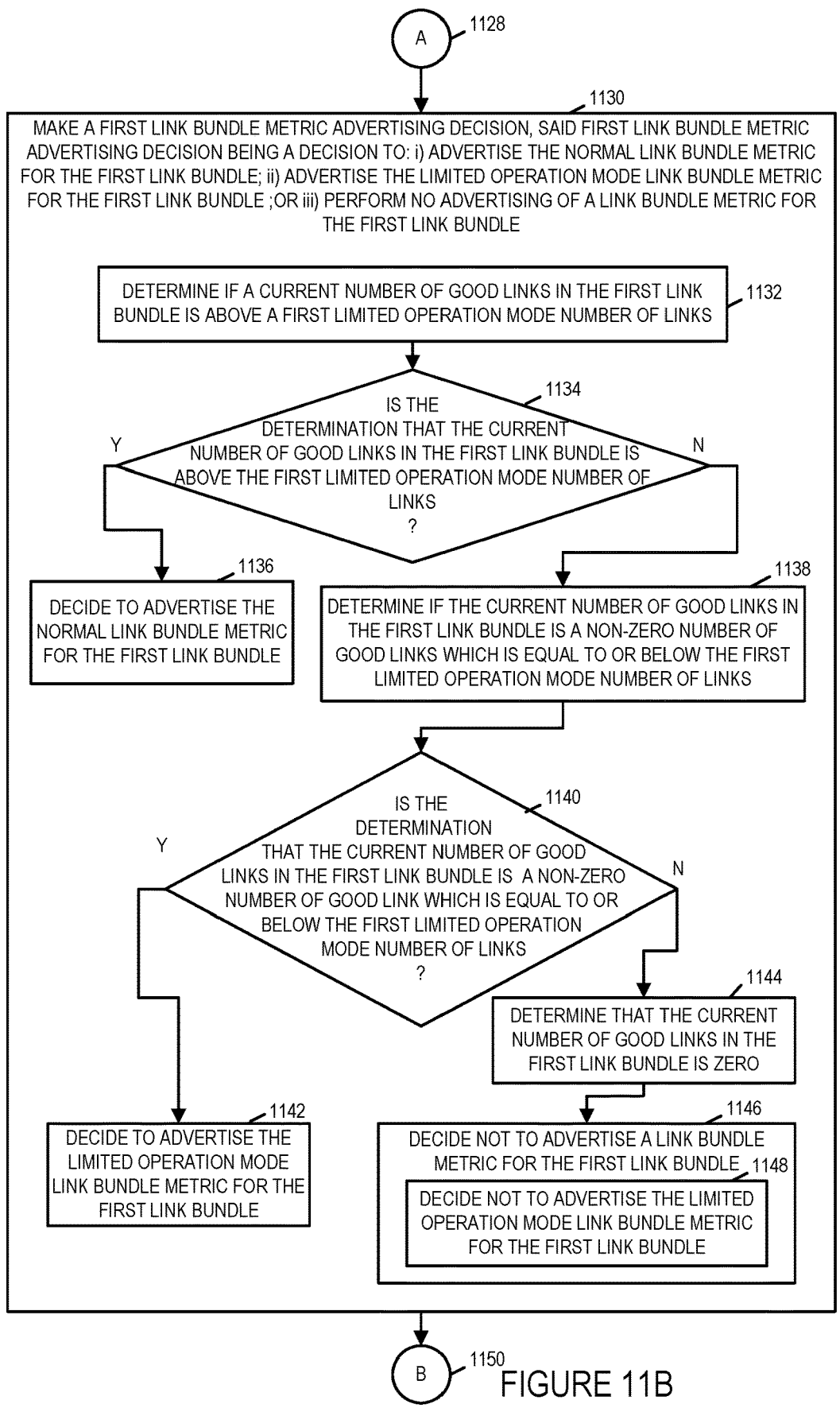
FIG. 11B is a second part of a flowchart of an exemplary method of operating a first node, e.g., a router, in accordance with an exemplary embodiment.
Figures 11, 11A, 11B, 11C:
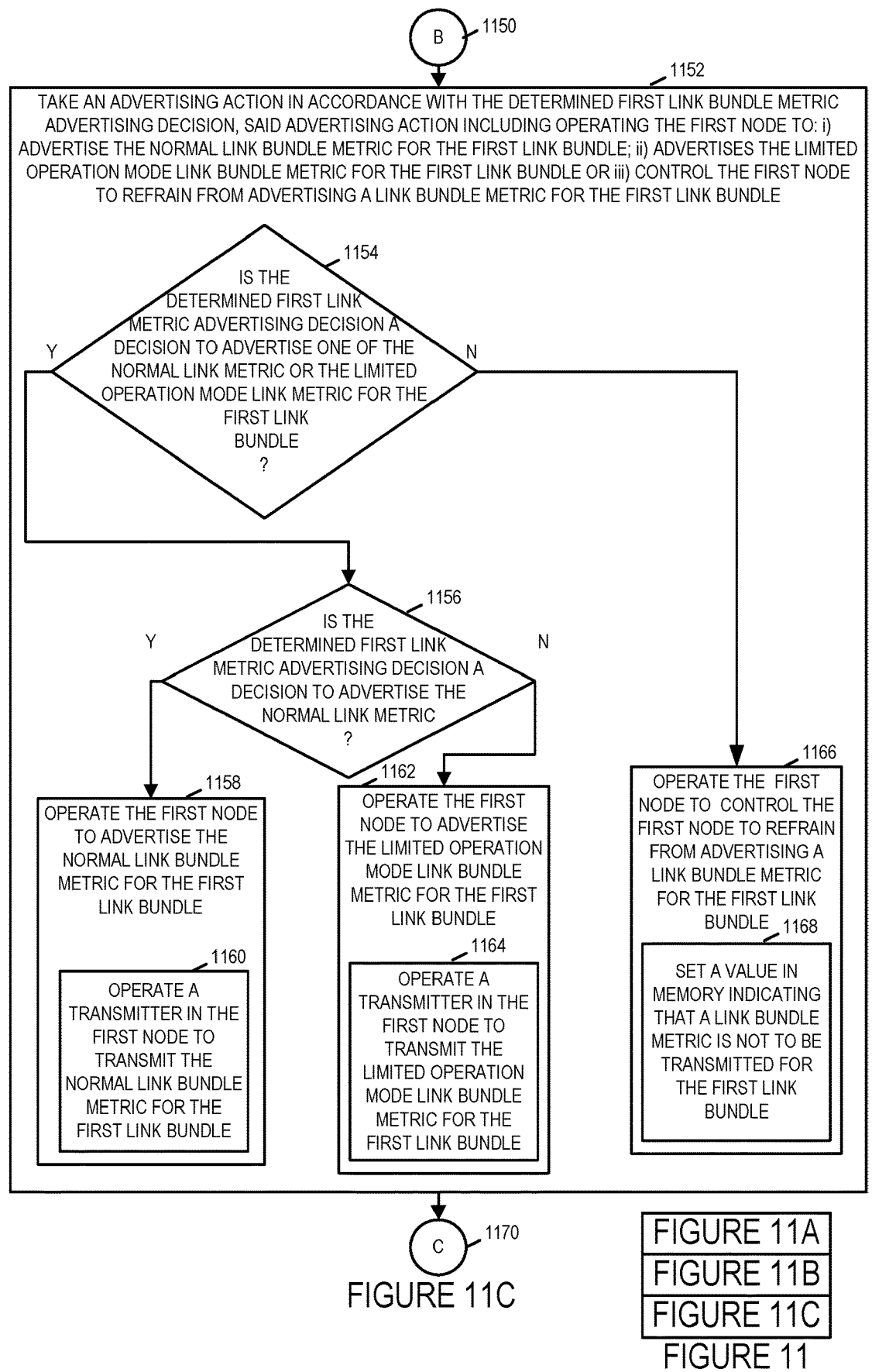
FIG. 11C is a third part of a flowchart of an exemplary method of operating a node, e.g., a router, in accordance with an exemplary embodiment.
FIG. 11 comprises the combination of FIG. 11A, FIG. 11B, and FIG. 11C.

FIG. 11, comprising the combination of FIG. 11A, FIG. 11B and FIG. 11C, is a flowchart of an exemplary method of operating a first network node, e.g., a first router, in a communications network, in accordance with an exemplary embodiment. In some embodiments, the first node is, e.g., one of router 1 102, router 2 104, router 3 106, router 4 108, router 5 110 or router 6 112 of the communications network shown in FIGS. 1-6.

Operation starts in step 1102 in which the first network node is powered on and initialized. Operation proceeds from start step 1102 to step 1104. In step 1104 the first network node determines a normal link bundle metric for a first link bundle including a plurality of communications links between the first network node a second network node. In some embodiments, step 1104 includes steps 1106 and 1108. In some embodiments, step 1104 includes step 1110.

In step 1106 the first network node receives input indicating a first normal link bundle metric corresponding to the first link bundle. Operation proceeds from step 1106 to step 1108, in which the first network nodes uses the received first normal link bundle metric as the determined normal link bundle metric for the first link bundle.

In step 1110 the first network node automatically generates the normal link bundle metric for the first link bundle metric using an automated link weight generation algorithm. In some such embodiments, step 1110 includes step 1112 in which the first network node uses a link weight generation algorithm to generate the normal link bundle metric for the first link bundle.

In some embodiments, operation proceeds from step 1104 to step 1114; in other embodiments, e.g., an embodiment including step 1124, operation proceeds from step 1104 to step 1122.

In step 1114, the first network node determines a limited operation mode link bundle metric for the first link bundle. In some embodiments, step 1114 includes steps 1116 and 1118. In some other embodiments, step 1114 includes step 1117 and 1119. In some other embodiments, step 1114 includes step 1120.

In step 1116 the first network node receives input indicating a first limited operation mode link bundle metric corresponding to the first link bundle. Operation proceeds from step 1116 to step 1118. In step 1118 the first network node uses the received first limited operation mode link bundle metric as the determined limited operation mode link bundle metric for the first link bundle.

In step 1117 the first network node receives input indicating a cost factor greater than one. Operation proceeds from step 1117 to step 1119. In step 1119 the network node multiples the first normal link metric corresponding to the first link bundle by a cost factor greater than one, e.g., the received cost factor from step 1117, to generate the limited operation mode link metric for the first link bundle.

In step 1120 the first network node sets the limited operation mode link bundle metric for the first link bundle to a maximum link metric value. For example, the limited operation mode link bundle metric is set to the largest permitted link weight value to discourage its use where large values indicate links with longer paths or which are more costly in this way causing the routing system to avoid use of the faulty link bundle unless there are no other alternative links available since the path is indicated to be the most costly a path can be. In one exemplary embodiment, a link metric value is an integer in the range of 1 to 9, and the limited operation mode link bundle metric for the first link bundle is set to 9.

Operation proceeds from step 1114 to step 1122. In step 1122 the first network node determines the number of good links in a first link bundle including a plurality of communications links between the first network node and the second network node. In some embodiments, e.g., an embodiment in which step 1114 is omitted, operation proceeds from step 1122 to step 1124. In some other embodiments, e.g., an embodiment in which step 1114 is includes, operation proceeds from step 1122, via connecting node A 1128, to step 1130.

In step 1124, the first network node determines a limited operation mode link bundle metric for the first link bundle. In some embodiments, step 1124 includes one or both of step 1125 and step 1126. In step 1125 the first network node determines a cost factor greater than one as a function of the determined number of good links in the first link bundle. Operation proceeds from step 1125 to step 1126. In step 1126 the first network node multiples the first normal link metric corresponding to the first link bundle by a cost factor greater than one, e.g., the cost factor determined in step 1125, to generate the limited operation mode link bundle metric for the first link bundle. In some embodiments, the cost factor is a function of the current number of good links. In some embodiments, the cost factor is larger when the number of good links in the first bundle is less than a first limited operation mode number of links than when the number of good links is equal to the first limited operation number of links. For example, a larger cost factor is generated in step 1125 when the number of good links in the first bundle is one, than when the number of good links in the first bundle equals the first limited operation number of good links, e.g. equals 3. Operation proceeds from step 1124, via connecting node A 1128, to step 1130.

In step 1130 the first network node makes a first link bundle metric advertising decision, said first link bundle metric advertising decision being a decision to: i) advertise the normal link bundle metric for the first link bundle; ii) advertise the limited operation mode link bundle metric for the first link bundle; or iii) perform no advertising of a link bundle metric for the first link bundle. Step 1130 includes steps 1132, 1134, 1136, 1138, 1140, 1142, 1144 and 1146.

In step 1132 the first network node determines if the current number of good links in the first link bundle is above a first limited operation mode number of links, e.g. a limited operation threshold number. In some embodiments, when determined number of good links is above the first limited operation mode number of links this indicates that the first link bundle is operating in normal mode with all good links or with at least a sufficient number of good links to support normal link bundle mode operation, e.g., with a sufficient number of links to support a normal expected load traffic. Operation proceeds from step 1132 to step 1134.

In step 1134, if the determination is that the current number of good links in the first link bundle is above the first limited operation mode number of links, then operation proceeds from step 1134 to step 1136; otherwise, operation proceeds from step 1134 to step 1138. In step 1138 the first network node decides to advertise the normal link bundle metric for the first link bundle.

In step 1138 the first network node determines if the current number of good links in the first link bundle is a non-zero number of good links which is equal to or below the first limited operation number of links. Operation proceeds from step 1138 to step 1140.

In step 1140 if the determination is that the current number of good links in the first link bundle is a non-zero number of good links which is equal to or below the first limited operation number of links, then operation proceeds from step 1140 to step 1142; otherwise, operation proceeds from step 1140 to step 1144.

In step 1142 the first network node decides to advertise the limited operation mode link bundle metric for the first link bundle. Returning to step 1144, in step 1144 the first network node determines that the current number of good links in the first link bundle is zero. Operation proceeds from step 1144 to step 1146. In step 1146, the first network node decides not to advertise a link bundle metric for the first link bundle. Step 1146 includes step 1148 in which the first network node decides not to advertise the limited operation mode link bundle metric for the first link bundle. For example, when the number of good links in the first link bundle is zero, no link metric will be advertised for the first link bundle and thus devices will not consider using the first link bundle as a viable link when making routing decisions based on adverted link metrics, e.g., link weights which can be used for shortest path first, lowest cost path routing or other forms of link weight based routing decisions.

Operation proceeds from step 1130, via connecting node B 1150, to step 1152. In step 1152 the first network node takes and advertising action in accordance with the determined first link bundle metric advertising decision, said advertising action including operating the first network node to: i) advertise the normal link bundle metric for the first link bundle; ii) advertise the limited operation mode link bundle metric for the first link bundle; or iii) control the first network node to refrain from advertising a link bundle metric for the first link bundle. Step 1152 includes steps 1154, 1156, 1158, 1162 and 1166.

In step 1154 the first network node determines if first link metric advertising decision is a decision to advertise one of the normal link metric or the limited operation mode link metric for the first link bundle. If the determination is that the first link metric advertising decision is a decision to advertise one of the normal link metric or the limited operation mode link metric for the first link bundle, then operation proceeds from step 1154 to step 1156; otherwise, operation proceeds from step 1154 to step 1166. In step 1156 the first network node determines if the determined first link metric advertising decision is a decision to advertise a normal link metric. If the decision is a decision to advertise the normal link metric, then operation proceeds from step 1156 to step 1158; otherwise operation proceeds from step 1156 to step 1162.

In step 1158 the first network node is operated to advertise the normal link metric for the first link bundle. Step 1158 includes step 1160 in which the first network node operates a transmitter in the first network node to transmit the normal link bundle metric for the first link bundle. In some embodiments the transmitted normal link bundle metric is communicated in a routing protocol signal, e.g., an Open Shortest Path First (OSPF) routing protocol signal, an Intermediate System to Intermediate System (IS-IS) routing protocol signal, or a Border Gateway Protocol (BGP) routing protocol signal, which is used to facilitate routing decisions.

Returning to step 1162, in step 1162 the first network node is operated to advertise the limited operation mode link bundle metric for the first link bundle. Step 1162 includes step 1164 in which the first network node operates a transmitter in the first network node to transmit the limited operation mode link bundle metric for the first link bundle. In some embodiments the transmitted limited operation link bundle metric is communicated in a routing protocol signal, e.g., an Open Shortest Path First (OSPF) routing protocol signal, an Intermediate System to Intermediate System (IS-IS) routing protocol signal, or a Border Gateway Protocol (BGP) routing protocol signal, which is used to facilitate routing decisions.

Returning to step 1166, in step 1166 the first network node is operated to control the first network node to refrain from advertising a link bundle metric for the first link bundle. Step 1166 includes step 1168 in which the first network node sets a value in memory indicating that a link bundle metric is not to be transmitted for the first link bundle.

Operation proceeds from step 1152, via connecting node C 1170 to step 1122.

The flowchart 1100 of FIG. 11 has been described for an example of the first network node monitoring status, determining link metrics and performing a link metric advertising decision, and implementing the link metric advertising decision for a first link bundle. It should be appreciated that the first network node may, and sometimes does, perform similar operations for other link bundles, e.g. a second link bundle including a plurality of connections between the first network node and a third network node.

Figure 12:
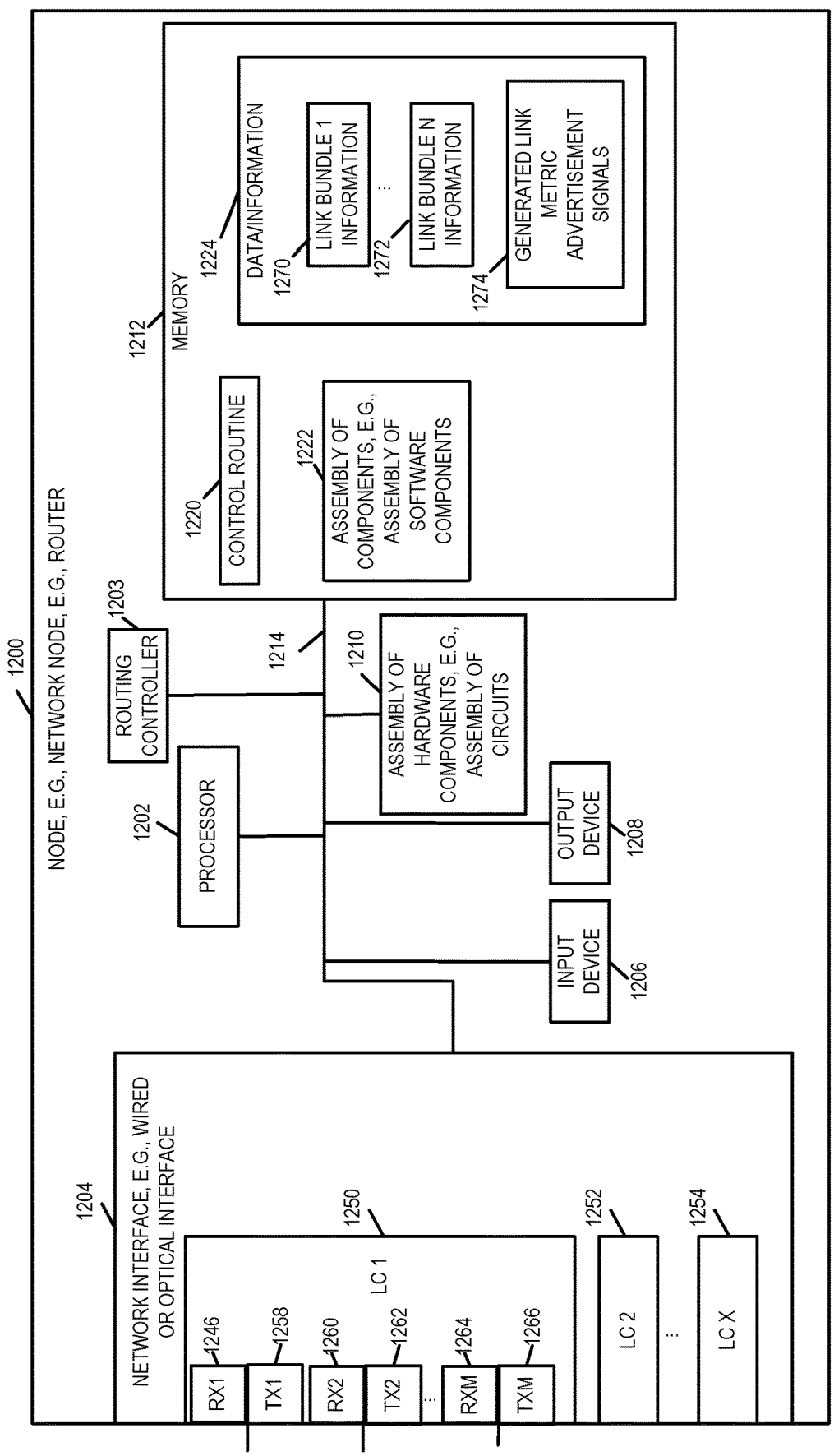
FIG. 12 is a drawing of an exemplary node, e.g., a router, in accordance with an exemplary embodiment.

FIG. 12 is a drawing of an exemplary node 1200, e.g., network node, e.g., a router, in accordance with an exemplary embodiment. Exemplary node 1200 is, e.g., one of the routers (102, 104, 106, 108, 110, 112) of FIGS. 1-6, a node implementing the method of flowchart 700 of FIG. 7 and/or a node implementing the method of flowchart 1100 of FIG. 11.

Exemplary node 1200 includes a processor 1202, e.g., a CPU, a routing controller 1203, a network interface 1204, an input device 1206, e.g., keyboard, an output device 1208, e.g., display, an assembly of hardware components 1210, e.g., an assembly of circuits, and memory 1212 coupled together via a bus 1214 over which the various elements may interchange data and information. The network interface 1204, e.g., a wired or optical interface, includes a plurality of line cars (line card 1 (LC1) 1250, LC 2 1252, . . . , LC X 1254). Each line card includes a plurality of receiver/transmitter pairs sometimes referred to as ports. LC 1 1250 includes receiver 1 (RX 1) 1246, transmitter 1 (TX 1) 1258; RX 2 1260, TX2 1262; . . . ; RX M 1264, TX M 1266. Each receiver/transmitter pair is coupled to a physical connection, e.g., physical link.

In the simplified example, of FIGS. 4-6, 9 physical links are shown as corresponding to an exemplary link bundle. In general, a bundle may or may not encompass each of the RX/TX pairs on a line card. A bundle may, and frequently does, share ports on a line card with other bundles. In various embodiments, a link bundle is represented by a link metric, e.g. a link bundle metric such as a normal link metric (NLM) or a limited operation mode link metric (LOMLM), which may be, and sometimes is, advertised, e.g. for routing purposes.

Memory 1212 includes a control routine 1220, an assembly of components 122, e.g., an assembly of software components, and data/information 1224. Data/information 1224 includes link bundle information including link bundle 1 information 1270, . . . , link bundle N information 1272. Data/information 1274 further includes generated link metric advertisements signals 1274.

Figure 13A:
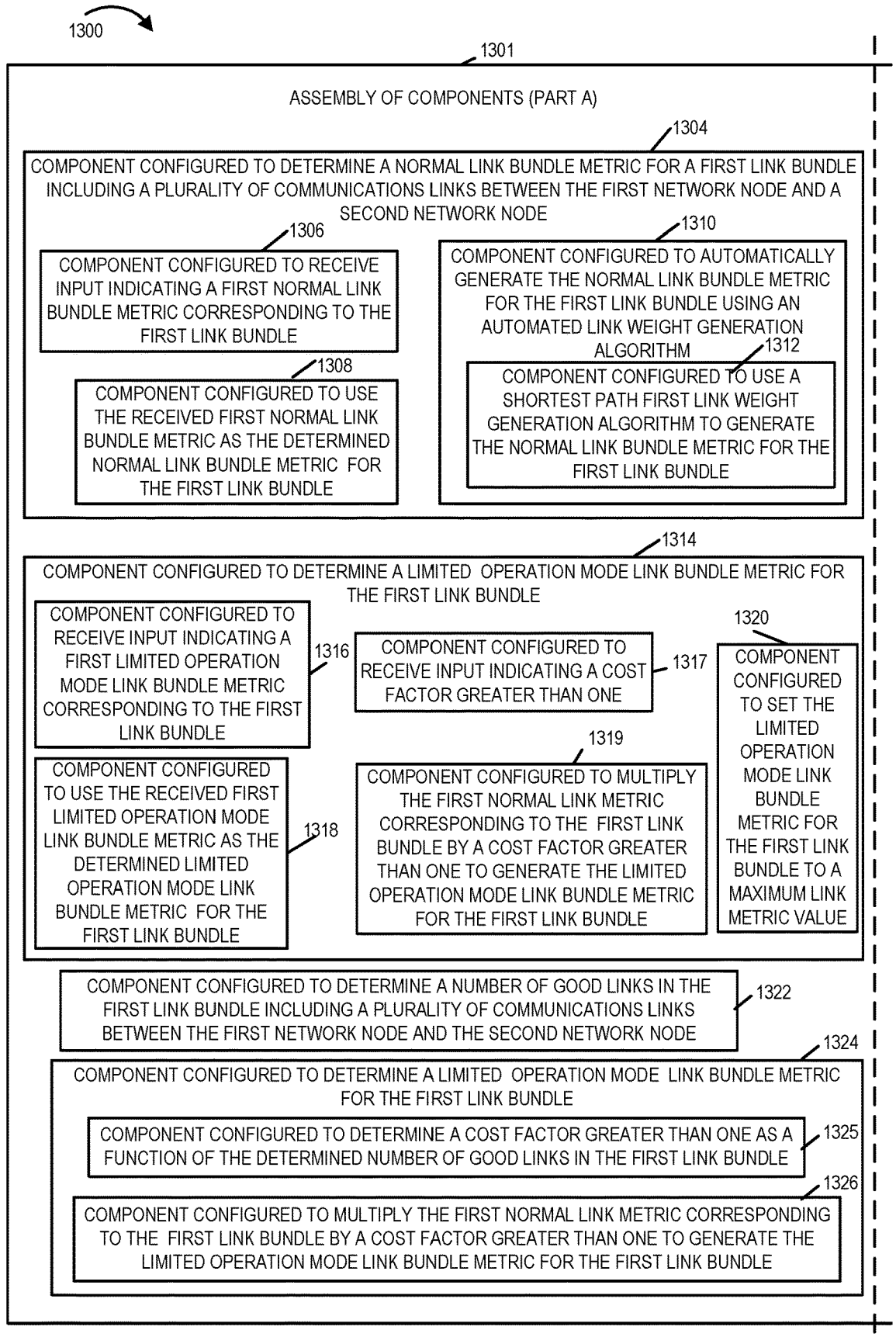
FIG. 13A is a drawing of a first part of an exemplary assembly of components which may be included in an exemplary communications device, e.g., a router, in accordance with an exemplary embodiment.
Figure 13B:
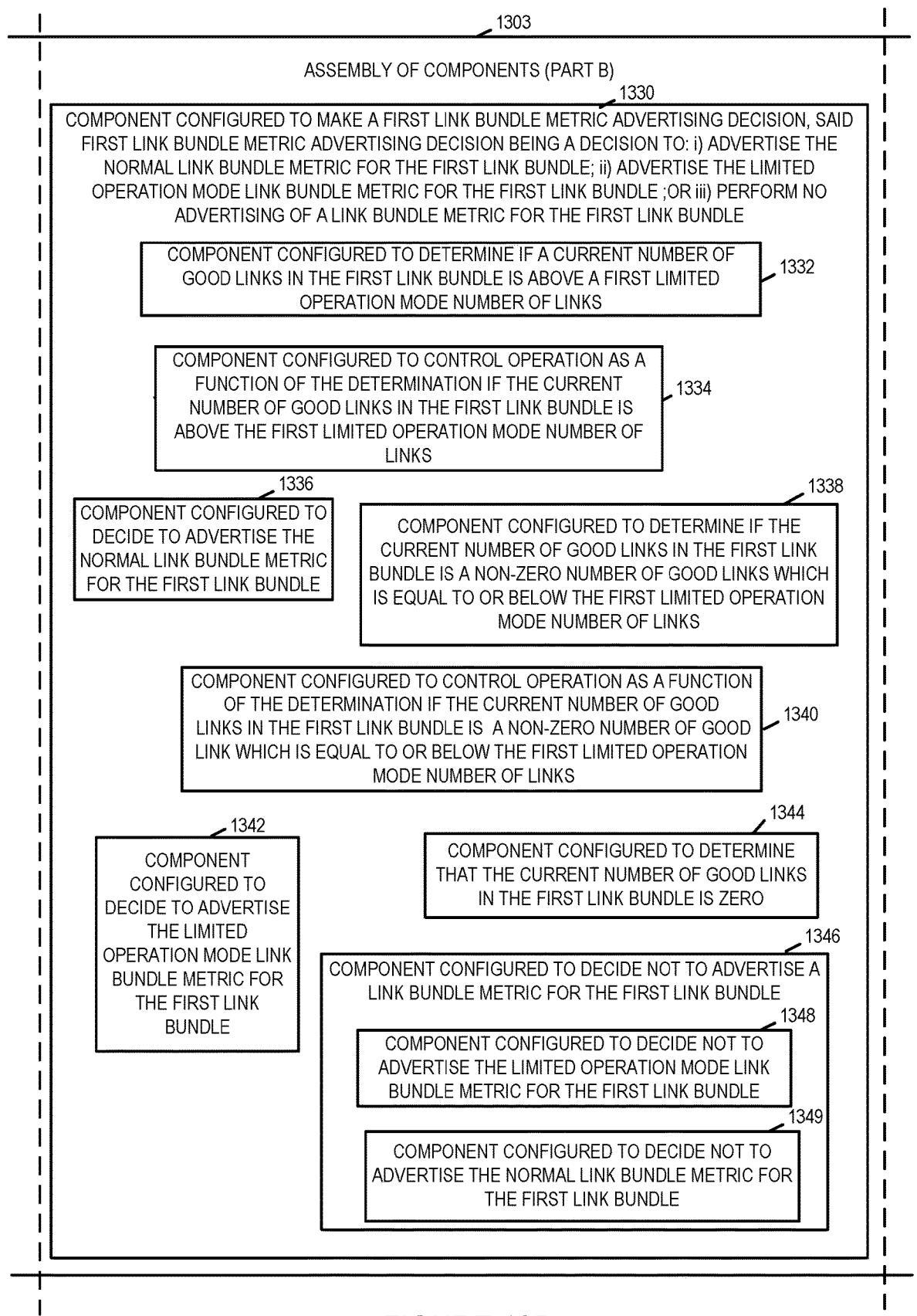
FIG. 13B is a drawing of a second part of an exemplary assembly of components which may be included in an exemplary communications device, e.g., a router, in accordance with an exemplary embodiment.

FIG. 13, comprising the combination of FIG. 13A, FIG. 13B and FIG. 13C, is a drawing of an exemplary assembly of components 1300 in accordance with an exemplary embodiment. Assembly of components 1300 is, e.g., included in a node, e.g., a router 102, 104, 106, 108, 110 or 112 of FIGS. 1-6, and/or node 1200, e.g., a network node such as a router of FIG. 12 and implement steps of an exemplary method, e.g., steps of the method of the flowchart 700 of FIG. 7 and/or steps of flowchart 1100 of FIG. 11.

Assembly of components 1300 can be, and in some embodiments is, used in node 1200 of FIG. 12. The components in the assembly of components 1300 can, and in some embodiments are, implemented fully in hardware within the processor 1202, e.g., as individual circuits. The components in the assembly of components 1300 can, and in some embodiments are, implemented fully in hardware within the assembly of components 1210, e.g., as individual circuits corresponding to the different components. In other embodiments some of the components are implemented, e.g., as circuits, within the processor 1202 with other components being implemented, e.g., as circuits within assembly of components 1210, external to and coupled to the processor 1202. As should be appreciated the level of integration of components on the processor and/or with some components being external to the processor may be one of design choice. Alternatively, rather than being implemented as circuits, all or some of the components may be implemented in software and stored in the memory 1212 of the node 1200, with the components controlling operation of the node 1200 to implement the functions corresponding to the components when the components are executed by a processor, e.g., processor 1202. In some such embodiments, the assembly of components 1300 is included in the memory 1212 as assembly of components 1222. In still other embodiments, various components in assembly of components 1300 are implemented as a combination of hardware and software, e.g., with another circuit external to the processor providing input to the processor 1202 which then under software control operates to perform a portion of a component's function. While processor 1202 is shown in the FIG. 12 embodiment as a single processor, e.g., computer, it should be appreciated that the processor 1202 may be implemented as one or more processors, e.g., computers. In some embodiments, one or more of the components in assembly of components 1300 are included in routing controller 1203.

When implemented in software the components include code, which when executed by the processor 1202, configure the processor 1202 to implement the function corresponding to the component. In embodiments where the assembly of components 1300 is stored in the memory 1212, the memory 1212 is a computer program product comprising a computer readable medium comprising code, e.g., individual code for each component, for causing at least one computer, e.g., processor 1202, to implement the functions to which the components correspond Completely hardware based or completely software based components may be used. However, it should be appreciated that any combination of software and hardware, e.g., circuit implemented components may be used to implement the functions. As should be appreciated, the components illustrated in FIG. 13 control and/or configure the node 1200, or elements therein such as the processor 1202, to perform the functions of corresponding steps illustrated and/or described in the method of one or more of the flowcharts, signaling diagrams and/or described with respect to any of the Figures. Thus the assembly of components 1300 includes various components that perform functions of corresponding one or more described and/or illustrated steps of an exemplary method, e.g., steps of the method of flowchart 700 of FIG. 7, the flowchart 1100 of FIG. 11 and/or described or shown with respect to any of the other figures.

Assembly of components 1300 includes a component 1304 configured to determine a normal link bundle metric for a first link bundle including a plurality of communications links between the first network node and a second network node, a component 1314 configured to determine a limited operation mode link bundle metric for the first link bundle, a component configured to determine a number of good links in the first link bundle including a plurality of communications links between the first network node and the second network node. Component 1304 includes a component 1306 configured to receive input indicating a first normal link bundle metric corresponding to the first link bundle, a component 1308 configured to use the received first normal link bundle metric as the determined normal link bundle metric for the first link bundle. Component 1304 further includes a component 1310 configured to automatically generate the normal link bundle metric for the first link bundle using an automated link weight generation algorithm. Component 1304 includes a component 1312 configured to use a shortest path first weight generation algorithm to generate the normal link bundle metric for the first link bundle. Component 1314 includes a component 1316 configured to receive input indicating a first limited operation mode link bundle metric corresponding to the first link bundle, a component 1318 configured to use the received first limited operation link bundle metric as the determined limited operation link bundle metric for the first link bundle, a component 1317 configured to receive user input indicating a cost factor greater than one, a component 1317 configured to multiply the first normal link metric corresponding to the first link bundle by a cost factor greater than one to generate the limited operation mode link bundle metric for the first link bundle, and a component 1320 configured to set the limited operation mode link bundle metric for the first link bundle to a maximum link metric value.

In some embodiments, assembly of components 1300 includes component 1324 configured to determine a limited operation mode link bundle metric, e.g., in place of component 1314. In some embodiments, component 1324 includes one or both of a component 1325 configured to determine a cost factor greater than one as a function of the determined number of good links in the first link bundle and a component 1326 configured to multiply the first normal link metric corresponding to the first link bundle by a cost factor greater than one to generate the limited operation mode link bundle metric for the first link bundle.

Assembly of components 1300 further includes a component 1330 configured to make a first link bundle metric advertising decision, said first link bundle metric advertising decision being a decision to: i) advertise the normal link bundle metric for the first link bundle; ii) advertise the limited operation link bundle metric of the first link bundle; or iii) perform no advertising of a link bundle metric for the first link bundle. Component 1330 includes a component 1332 configured to determine if a current number of good link in the first link bundle is above a first limited operation number of links, a component 1334 configured to control operation as a function of the determination if the current number of good links in the first link bundle is above the first limited operation mode number of links, and a component 1336 configured to decide to advertise the normal link bundle metric for the first link bundle in response to a determination that the current number of good links in the first link bundle is above the first limited operation mode number of links. Assembly of components 1330 further includes a component 1138 configured to determine if the current number of good links in the first link bundle is a non-zero number of good links which is equal to or below the first limited operation number of links, a component 1340 configured to control operation as a function of the determination if the current number of good links in the first link bundle is a non-zero number of good links which is equal to or below the first limited operation mode number of links, a component 1342 configured to decide to advertise the limited operation mode link bundle metric for the first link bundle in response to a determination that the current number of good links in the first link bundle is a non-zero number of good links which is equal to or below the first limited operation number of links. Component 1330 further includes a component 1342 configured to determine that the current number of good links in the first link bundle is zero, and a component 1346 configured to decide not to advertise a link bundle metric for the first link bundle in response to determining that there are not currently any good links in the first link bundle. Component 1346 includes a component configured to decide not to advertise the limited operation mode link bundle metric for the first link bundle and a component 1349 configured to decide not to advertise the normal link bundle metric for the first link bundle.

Assembly of components 1300 further includes a component 1352 configured to take an advertising action in accordance with the determined first link bundle metric advertising decision, said advertising action including operating the first node to: i) advertise the normal link bundle metric for the first link bundle; ii) advertise the limited operation link bundle metric for the first link bundle; or iii) control the first node to refrain from advertising a link bundle metric for the first link bundle. Component 1352 includes a component 1354 configured to determine if the first link metric advertising decision is a decision to advertise one of the normal link metric or the limited operation mode metric for the first link bundle and to control operation as a function of the determination, a component 1356 configured to determine if the first link metric advertising decision is a decision to advertise the normal link metric and to control operation as a function of the determination. Component 1352 further includes a component 1358 configured to operate the first node to advertise the normal link bundle metric for the first link bundle in response to a determination that the advertising decision is a decision to advertise the normal link bundle metric for the first link bundle, a component 1362 configured to operate the first node to advertise the limited operation mode link bundle metric for the first link bundle in response to a determination that the advertising decision is a decision to advertise the limited operation mode link bundle metric for the first link bundle, and a component 1366 configured to operate the first node to control the first node to refrain from advertising a link bundle metric for the first link bundle, in response to a determination that the advertising decision is a decision not to advertises either one of the normal link metric or the limited operation link metric for the first link bundle.

Component 1358 includes a component 1360 configured to operate a transmitter in the first node to transmit the normal link bundle metric for the first link bundle. Component 1362 includes a component 1364 configured to operate a transmitter in the first node to transmit the limited operation mode link bundle metric for the first link bundle. Component 1366 includes a component 1368 configured to set a value in memory indicating that a link bundle metric is not to be transmitted for the first link bundle.

Figure 14:
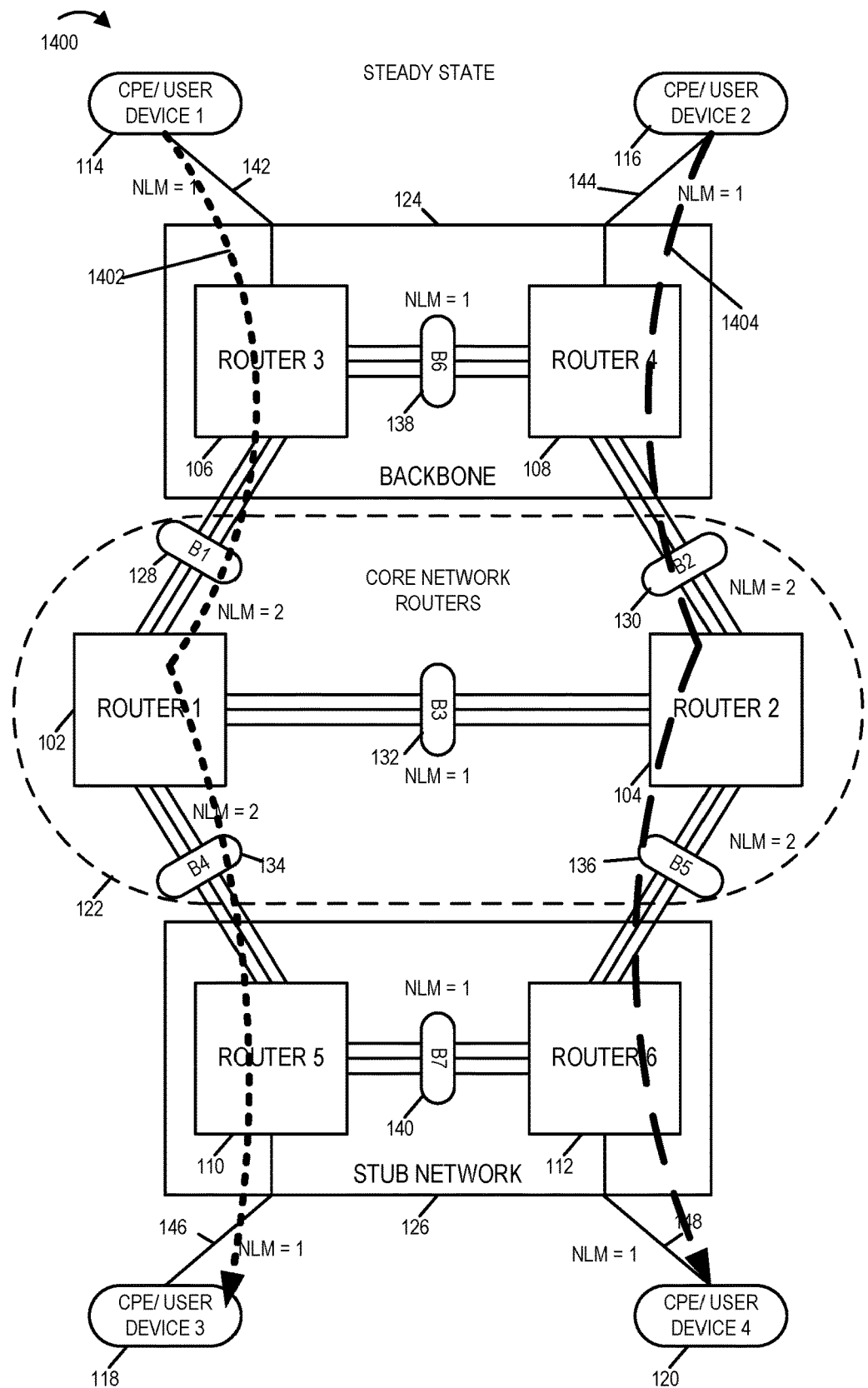
FIG. 14 illustrates examples of an exemplary selected communications paths corresponding to the example of FIG. 1 and FIG. 4.

FIG. 14 is a drawing 1400, corresponding to the example of FIG. 1 and FIG. 4, which illustrates examples of exemplary selected communications paths 1402, 1404 which were selected using the advertised link metrics in accordance with an exemplary embodiment. Exemplary communications path 1402 between CPE/user device 1 114 and CPE/user device 3 118 traverses link 142, router 3 106, link bundle B1 128, router 1 102, link bundle B4 134, router 5 110 and link 146. Exemplary communications path 1404 between CPE/user device 2 116 and CPE/user device 4 120 traverses link 144, router 4 108, link bundle B2 130, router 2 104, link bundle B5 136, router 6 112 and link 148.

Figure 15:
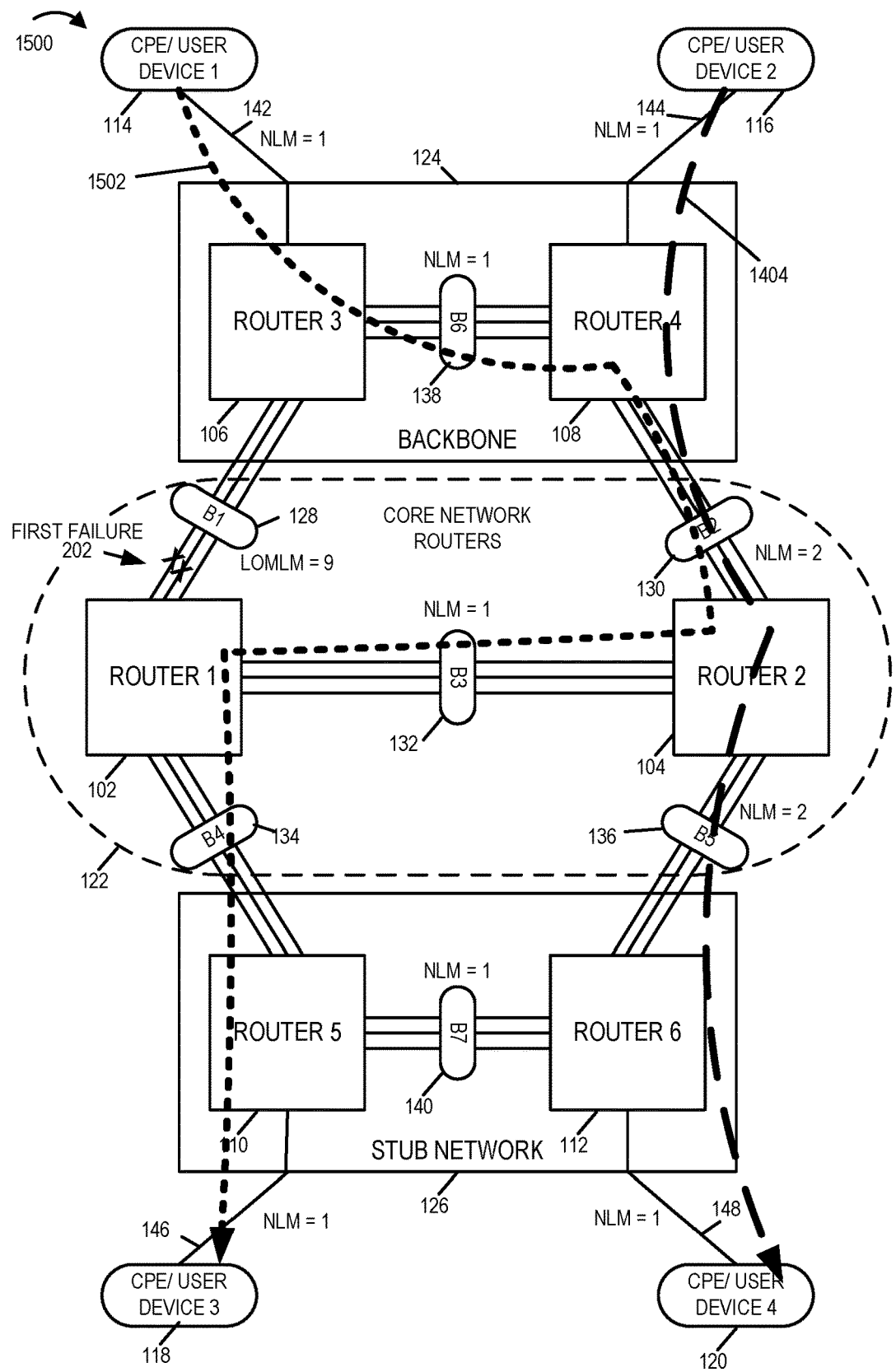
FIG. 15 illustrates an example of an exemplary selected communications paths corresponding to the example of FIG. 2 and FIG. 5.

FIG. 15 is a drawing 1500, corresponding to the example of FIG. 2 and FIG. 5, which illustrates examples of exemplary selected communications paths 1502, 1504 which were selected using the advertised link metrics in accordance with an exemplary embodiment. Exemplary communications path 1502 between CPE/user device 1 114 and CPE/user device 3 118 traverses link 142, router 3 106, link bundle B6 138, router 4 108, link bundle B2 130, router 2 104, link bundle B3 132, router 1 102, link bundle B4 134, router 5 110 and link 146. Exemplary communications path 1504 between CPE/user device 2 116 and CPE/user device 4 120 traverses link 144, router 4 108, link bundle B2 130, router 2 104, link bundle B5 136, router 6 112 and link 148.

Figure 16:
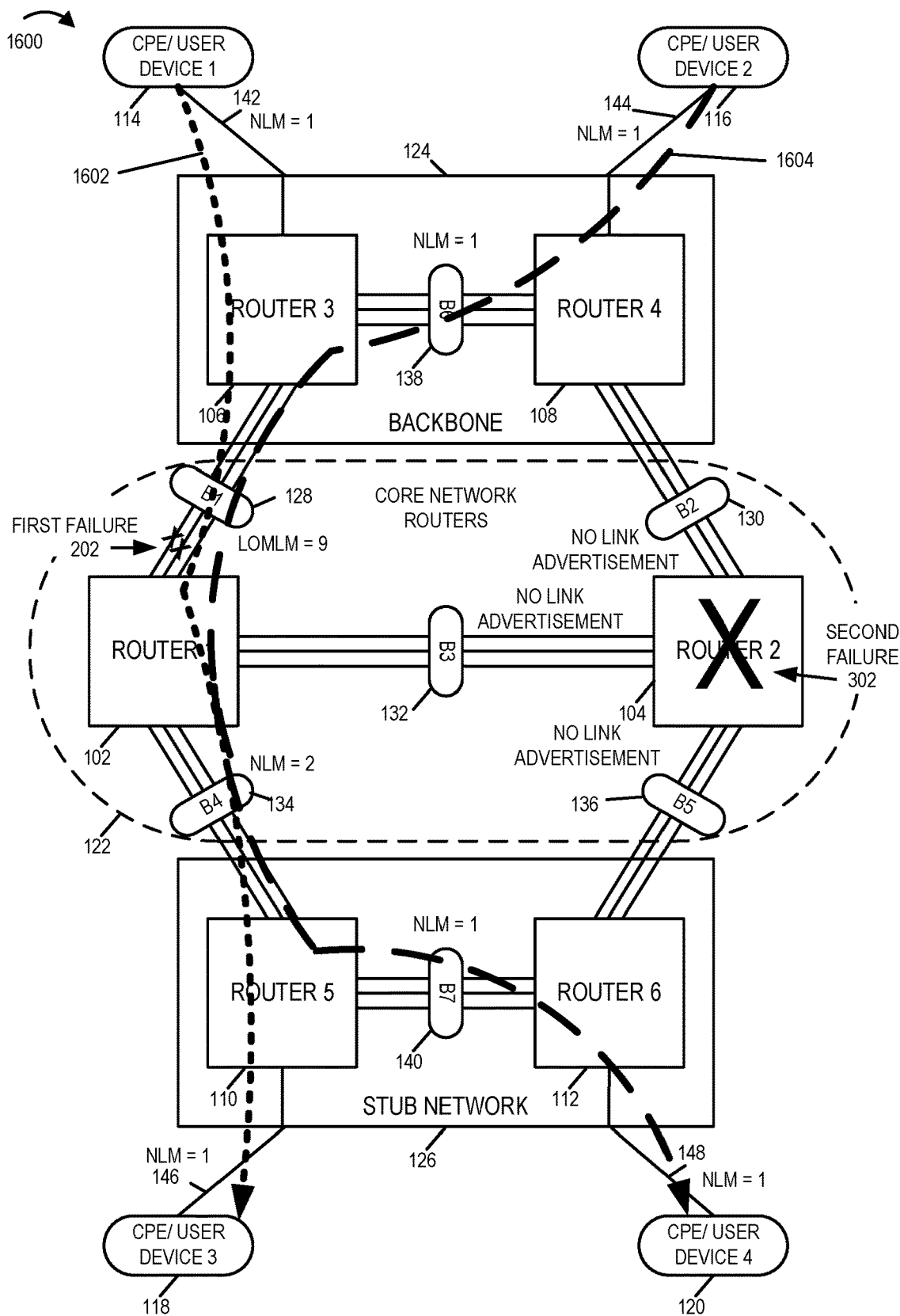
FIG. 16 illustrates an example of an exemplary selected communications paths corresponding to the example of FIG. 3 and FIG. 6.

FIG. 16 is a drawing 1600, corresponding to the example of FIG. 3 and FIG. 6, which illustrates examples of exemplary selected communications paths 1602, 1604 which were selected using the advertised link metrics in accordance with an exemplary embodiment. Exemplary communications path 1602 between CPE/user device 1 114 and CPE/user device 3 118 traverses link 142, router 3 106, link bundle B1 128, router 1 102, link bundle B4 134, router 5 110 and link 146. Exemplary communications path 1604 between CPE/user device 2 116 and CPE/user device 4 120 traverses link 144, router 4 108, link bundle B6 138, router 3 106, link bundle B1 128, router 1 102, link bundle B4 134, router 5 110, link bundle B7 140, router 6 112, and link 148.

FIG. 17 is a drawing of a table 1700 illustrating exemplary bundle information for an exemplary link bundle, wherein the limited operation mode link metric for the link bundle is a maximum link weight value, in accordance with an exemplary embodiment. First column 1702 includes time information. Second column 1704 includes normal link metric (NLM) values for the link bundle at different times. Third column 1706 includes a limited operation threshold value for the link bundle at different times. Fourth column 1708 includes a limited operation mode link metric (LOMLM) value for the link bundle at different times. Fifth column 1710 lists a current mode for the link bundle at different times. Sixth column 1712 lists the number of operational links for the link bundle at different times, and seventh column 1714 lists whether or not a link metric is advertised, e.g., whether or not one of NLM or LOMLM, is advertised at different times, for the link bundle.

First row 1716 indicates that at time T0, the link bundle has a NLM=2, a limited operation threshold=3, a LOMLM=9, currently has 9 operational links, is in normal mode and the advertising link metric indicator is set to yes. Thus, the normal link metric, which has a value of 2, will be advertised.

Second row 1718 indicates that at time T1, the link bundle has a NLM=2, a limited operation threshold=3, a LOMLM=9, currently has 7 operational links, is in normal mode, and the advertising link metric indicator is set to yes. Thus, the normal link metric, which has a value of 2, will be advertised.

Third row 1720 indicates that at time T2, the link bundle has a NLM=2, a limited operation threshold=3, a LOMLM=9, currently has 4 operational links, is in normal mode, and the advertising link metric indicator is set to yes. Thus, the normal link metric, which has a value of 2, will be advertised.

Fourth row 1722 indicates that at time T3, the link bundle has a NLM=2, a limited operation threshold=3, a LOMLM=9, currently has 3 operational links, is in limited operation mode, and the advertising link metric indicator is set to yes. Thus, the limited operation mode link metric, which has a value of 9, will be advertised.

Fifth row 1724 indicates that at time T4, the link bundle has a NLM=2, a limited operation threshold=3, a LOMLM=9, currently has 1 operational link, is in limited operation mode, and the advertising link metric indicator is set to yes. Thus, the limited operation mode link metric, which has a value of 9, will be advertised.

Sixth row 1726 indicates that at time T4, the link bundle has a NLM=2, a limited operation threshold=3, a LOMLM=9, currently has 0 operational links, is in down mode, and the advertising link metric indicator is set to no. Thus, neither the normal link metric nor the limited operation mode link metric will be advertised, and the node is controlled to refrain from transmitting a link metric corresponding to the link bundle.

FIG. 18 is a drawing of a table 1800 illustrating exemplary bundle information for an exemplary first link bundle, wherein the limited operation mode link metric for the first link bundle is a multiple, e.g., 4X, of the normal link metric for the first link bundle, in accordance with an exemplary embodiment. First column 1802 includes time information. Second column 1804 includes normal link metric (NLM) values for the link bundle at different times. Third column 1806 includes a limited operation threshold value for the link bundle at different times. Fourth column 1808 includes a limited operation mode link metric (LOMLM) value for the link bundle at different times. Fifth column 1810 lists a current mode for the link bundle at different times. Sixth column 1812 lists the number of operational links for the link bundle at different times, and seventh column 1814 lists whether or not a link metric is advertised, e.g., whether or not one of NLM or LOMLM, is advertised at different times, for the link bundle.

First row 1816 indicates that at time T0, the first link bundle has a NLM=2, a limited operation threshold=3, a LOMLM=8, currently has 9 operational links, is in normal mode and the advertising link metric indicator is set to yes. Thus, the normal link metric, which has a value of 2, will be advertised.

Second row 1818 indicates that at time T1, the first link bundle has a NLM=2, a limited operation threshold=3, a LOMLM=8, currently has 7 operational links, is in normal mode, and the advertising link metric indicator is set to yes. Thus, the normal link metric, which has a value of 2, will be advertised.

Third row 1820 indicates that at time T2, the first link bundle has a NLM=2, a limited operation threshold=3, a LOMLM=8, currently has 4 operational links, is in normal mode, and the advertising link metric indicator is set to yes. Thus, the normal link metric, which has a value of 2, will be advertised.

Fourth row 1822 indicates that at time T3, the first link bundle has a NLM=2, a limited operation threshold=3, a LOMLM=8, currently has 3 operational links, is in limited operation mode, and the advertising link metric indicator is set to yes. Thus, the limited operation mode link metric, which has a value of 8, will be advertised.

Fifth row 1824 indicates that at time T4, the first link bundle has a NLM=2, a limited operation threshold=3, a LOMLM=8, currently has 1 operational link, is in limited operation mode, and the advertising link metric indicator is set to yes. Thus, the limited operation mode link metric, which has a value of 8, will be advertised.

Sixth row 1826 indicates that at time T4, the first link bundle has a NLM=2, a limited operation threshold=3, a LOMLM=8, currently has 0 operational links, is in down mode, and the advertising link metric indicator is set to no. Thus, neither the normal link metric nor the limited operation mode link metric will be advertised, and the node is controlled to refrain from transmitting a link metric corresponding to the link bundle.

FIG. 19 is a drawing of a table 1900 illustrating exemplary bundle information for an exemplary second link bundle, wherein the limited operation mode link metric for the second link bundle is multiple, e.g., 4X, of the normal link metric for the second link bundle, in accordance with an exemplary embodiment. First column 1902 includes time information. Second column 1904 includes normal link metric (NLM) values for the link bundle at different times. Third column 1906 includes a limited operation threshold value for the link bundle at different times. Fourth column 1908 includes a limited operation mode link metric (LOMLM) value for the link bundle at different times. Fifth column 1910 lists a current mode for the link bundle at different times. Sixth column 1912 lists the number of operational links for the link bundle at different times, and seventh column 1914 lists whether or not a link metric is advertised, e.g., whether or not one of NLM or LOMLM, is advertised at different times, for the link bundle.

First row 1916 indicates that at time T0, the second link bundle has a NLM=1, a limited operation threshold=3, a LOMLM=4, currently has 9 operational links, is in normal mode and the advertising link metric indicator is set to yes. Thus, the normal link metric, which has a value of 2, will be advertised.

Second row 1918 indicates that at time T1, the second link bundle has a NLM=1, a limited operation threshold=3, a LOMLM=4, currently has 7 operational links, is in normal mode, and the advertising link metric indicator is set to yes. Thus, the normal link metric, which has a value of 2, will be advertised.

Third row 1920 indicates that at time T2, the second link bundle has a NLM=1, a limited operation threshold=3, a LOMLM=4, currently has 4 operational links, is in normal mode, and the advertising link metric indicator is set to yes. Thus, the normal link metric, which has a value of 2, will be advertised.

Fourth row 1922 indicates that at time T3, the second link bundle has a NLM=1, a limited operation threshold=3, a LOMLM=4, currently has 3 operational links, is in limited operation mode, and the advertising link metric indicator is set to yes. Thus, the limited operation mode link metric, which has a value of 4, will be advertised.

Fifth row 1924 indicates that at time T4, the second link bundle has a NLM=1, a limited operation threshold=3, a LOMLM=4, currently has 1 operational link, is in limited operation mode, and the advertising link metric indicator is set to yes. Thus, the limited operation mode link metric, which has a value of 4, will be advertised.

Sixth row 1926 indicates that at time T4, the second link bundle has a NLM=1, a limited operation threshold=3, a LOMLM=4, currently has 0 operational links, is in down mode, and the advertising link metric indicator is set to no. Thus, neither the normal link metric nor the limited operation mode link metric will be advertised, and the node is controlled to refrain from transmitting a link metric corresponding to the link bundle.

FIG. 20 is a drawing of a table 2000 illustrating exemplary bundle information for an exemplary link bundle, wherein the limited operation mode link metric for the link bundle is a function of the determined number of operational links in the link bundle, in accordance with an exemplary embodiment. First column 2002 includes time information. Second column 2004 includes normal link metric (NLM) values for the link bundle at different times. Third column 2006 includes a limited operation threshold value for the link bundle at different times. Fourth column 2008 lists the number of operation links for the link bundle at different times. Fifth column 2009 lists a cost factor value for the link bundle at different times. Sixth column 2010 includes a limited operation mode link metric (LOMLM) value for the link bundle at different times. Seventh column 2012 lists a current mode for the link bundle at different times, and eighth column 2014 lists whether or not a link metric is advertised, e.g., whether or not one of NLM or LOMLM, is advertised at different times, for the link bundle.

First row 2016 indicates that at time T0, the link bundle has a NLM=2, a limited operation threshold=3, currently has 9 operational links, has a cost factor of 3.5, has a LOMLM=7, is in normal mode and the advertising link metric indicator is set to yes. Thus, the normal link metric, which has a value of 2, will be advertised.

Second row 2018 indicates that at time T1, the link bundle has a NLM=2, a limited operation threshold=3, currently has 4 operational links, has a cost factor of 3.5, has a LOMLM=7, is in normal mode and the advertising link metric indicator is set to yes. Thus, the normal link metric, which has a value of 2, will be advertised.

Third row 2020 indicates that at time T2, the link bundle has a NLM=2, a limited operation threshold=3, currently has 3 operational links, has a cost factor of 3.5, has a LOMLM=7, is in limited operation mode and the advertising link metric indicator is set to yes. Thus, the limited operation mode link metric, which has a value of 7, will be advertised.

Fourth row 2022 indicates that at time T3, the link bundle has a NLM=2, a limited operation threshold=3, currently has 2 operational links, has a cost factor of 4, has a LOMLM=8, is in limited operation mode and the advertising link metric indicator is set to yes. Thus, the limited operation mode link metric, which has a value of 8, will be advertised.

Fifth row 2024 indicates that at time T4, the link bundle has a NLM=2, a limited operation threshold=3, currently has 1 operational links, has a cost factor of 4.5, has a LOMLM=9, is in limited operation mode and the advertising link metric indicator is set to yes. Thus, the limited operation mode link metric, which has a value of 9, will be advertised. Sixth row 2026 indicates that at time T5, the link bundle has a NLM=2, a limited operation threshold=3, currently has 0 operational links, has a cost factor of 4.5, has a LOMLM=9, is in down mode and the advertising link metric indicator is set to no. Thus, neither the normal link metric nor the limited operation mode link metric for the link bundle will be advertised.

Figure 21A:
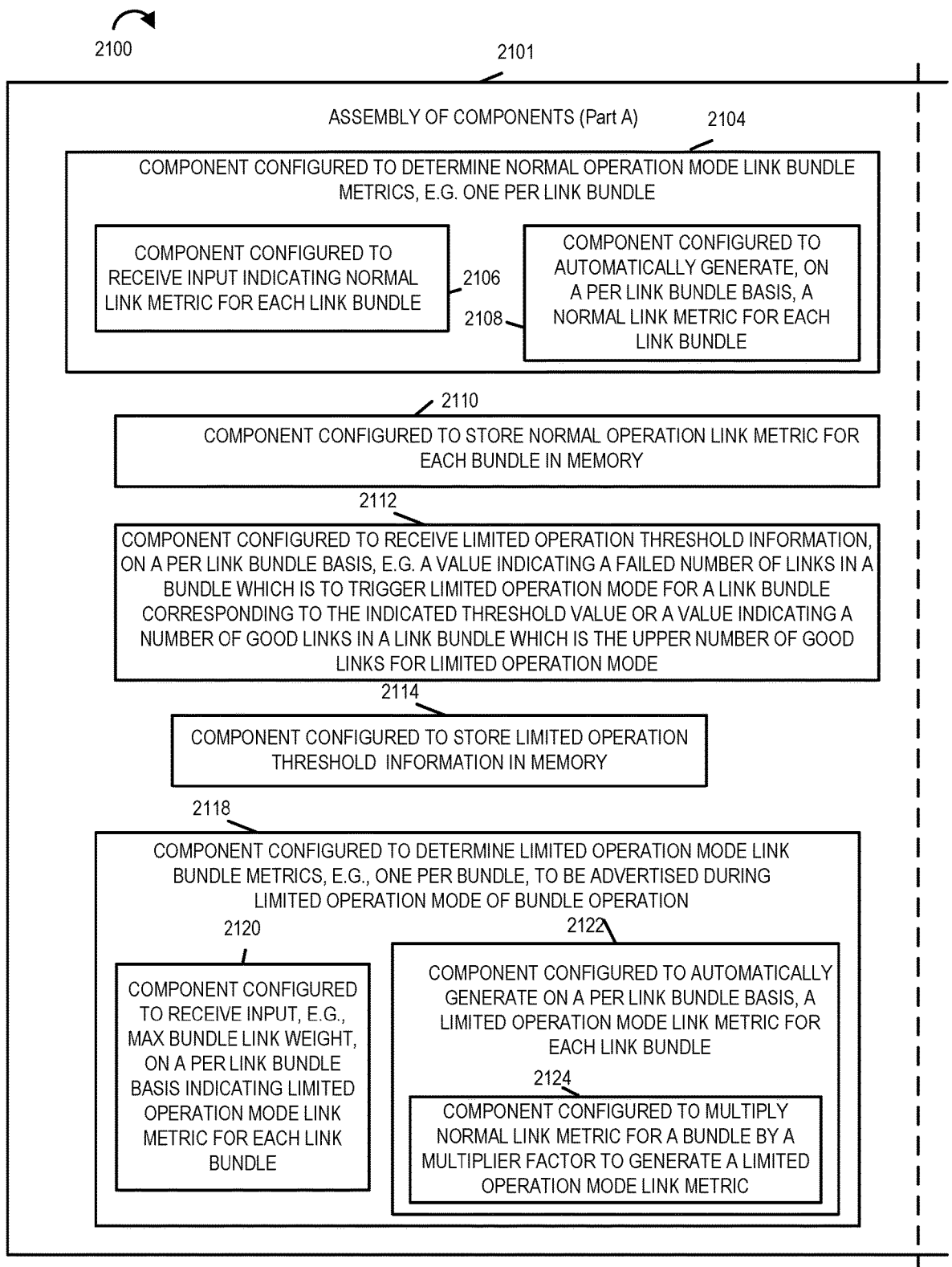
FIG. 21A is a drawing of a first part of an exemplary assembly of components which may be included in an exemplary communications device, e.g., a router, in accordance with an exemplary embodiment.
Figure 21B:
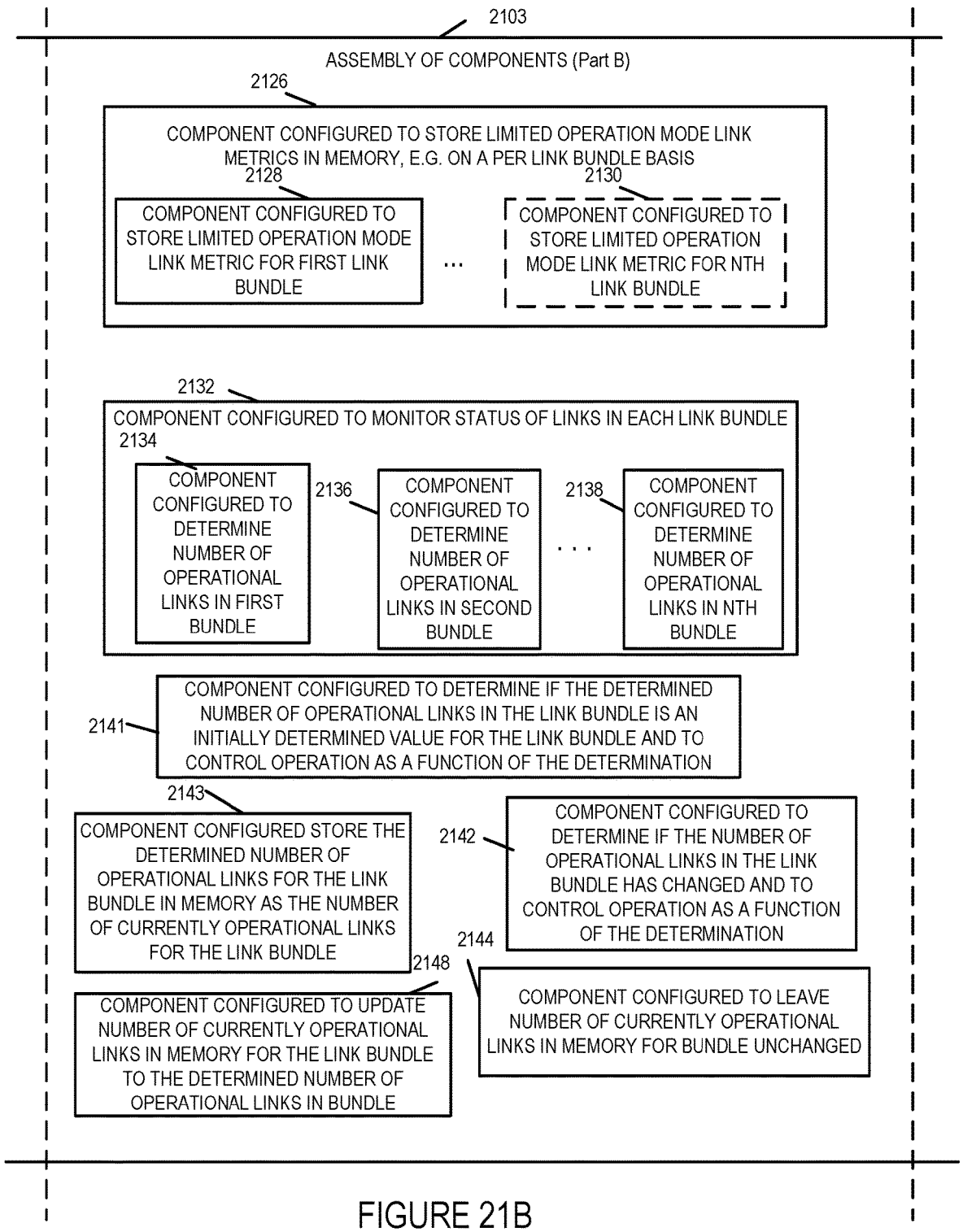
FIG. 21B is a drawing of a second part of an exemplary assembly of components which may be included in an exemplary communications device, e.g., a router, in accordance with an exemplary embodiment.
Figure 21:
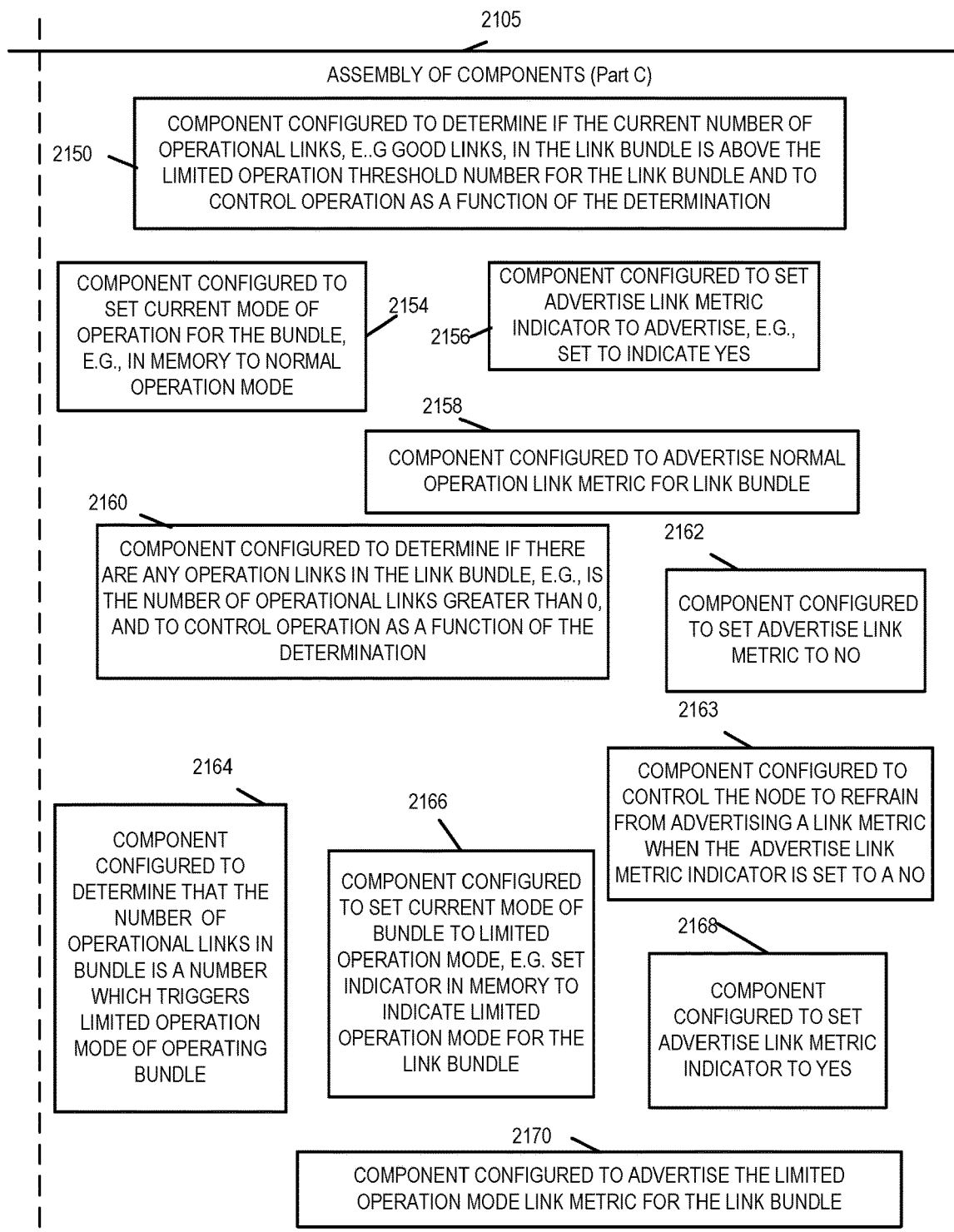
FIG. 21 comprises the combination of FIG. 21A, FIG. 21B and FIG. 21C.

FIG. 21, comprising the combination of FIG. 21A, FIG. 21B and FIG. 21C, is a drawing of an exemplary assembly of components 2100, comprising the combination of Part A 2101, Part B 2103 and Part C 2105, which may be included in an exemplary communications device, e.g., a router, in accordance with an exemplary embodiment. Assembly of components 2100 is, e.g., included in a node, e.g., a router 102, 104, 106, 108, 110 or 112 of FIGS. 1-6, and/or node 1200, e.g., a network node such as a router of FIG. 12 and implement steps of an exemplary method, e.g., steps of the method of the flowchart 700 of FIG. 7 and/or steps of flowchart 1100 of FIG. 11.

Assembly of components 2100 can be, and in some embodiments is, used in node 1200 of FIG. 12. The components in the assembly of components 2100 can, and in some embodiments are, implemented fully in hardware within the processor 1202, e.g., as individual circuits. The components in the assembly of components 2100 can, and in some embodiments are, implemented fully in hardware within the assembly of components 1210, e.g., as individual circuits corresponding to the different components. In other embodiments some of the components are implemented, e.g., as circuits, within the processor 1202 with other components being implemented, e.g., as circuits within assembly of components 1210, external to and coupled to the processor 1202. As should be appreciated the level of integration of components on the processor and/or with some components being external to the processor may be one of design choice. Alternatively, rather than being implemented as circuits, all or some of the components may be implemented in software and stored in the memory 1212 of the node 1200, with the components controlling operation of the node 1200 to implement the functions corresponding to the components when the components are executed by a processor, e.g., processor 1202. In some such embodiments, the assembly of components 2100 is included in the memory 1212 as assembly of components 1222. In still other embodiments, various components in assembly of components 2100 are implemented as a combination of hardware and software, e.g., with another circuit external to the processor providing input to the processor 1202 which then under software control operates to perform a portion of a component's function. While processor 1202 is shown in the FIG. 12 embodiment as a single processor, e.g., computer, it should be appreciated that the processor 1202 may be implemented as one or more processors, e.g., computers. In some embodiments, one or more of the components in assembly of components 2100 are included in routing controller 1203.

When implemented in software the components include code, which when executed by the processor 1202, configure the processor 1202 to implement the function corresponding to the component. In embodiments where the assembly of components 2100 is stored in the memory 1212, the memory 1212 is a computer program product comprising a computer readable medium comprising code, e.g., individual code for each component, for causing at least one computer, e.g., processor 1202, to implement the functions to which the components correspond Completely hardware based or completely software based components may be used. However, it should be appreciated that any combination of software and hardware, e.g., circuit implemented components may be used to implement the functions. As should be appreciated, the components illustrated in FIG. 21 control and/or configure the node 1200, or elements therein such as the processor 1202, to perform the functions of corresponding steps illustrated and/or described in the method of one or more of the flowcharts, signaling diagrams and/or described with respect to any of the Figures. Thus the assembly of components 2100 includes various components that perform functions of corresponding one or more described and/or illustrated steps of an exemplary method, e.g., steps of the method of flowchart 700 of FIG. 7, the flowchart 1100 of FIG. 11 and/or described or shown with respect to any of the other figures.

Assembly of components 2100 includes a component 2104 configured to determine normal operation mode link bundle metrics, e.g., one per links bundle. Component 2104 includes a component 2106 configured to receive input indicating a normal link metric for each link bundle and a component 2108 configured to automatically generate, on a per link bundle basis, a normal link metric for each link bundle.

Assembly of components 2100 further includes a component 2110 configured to store a normal operation link metric for each link bundle in memory, and a component 2112 configured to receive limited operation threshold information, on a per link bundle basis, e.g., a value indicating a number of links in a link bundle which is to trigger limited operation mode for the link bundle. In some embodiments, the value indicating a number of links in the link bundle which is to trigger limited operation mode for the link bundle indicates a failed number of links in the bundle. In some embodiments, the value indicating a number of links in the link bundle which is to trigger limited operation mode for the link bundle indicates a number of operational, e.g., good links in the link bundle, which is the maximum number of good links for limited operation mode for the link bundle. In some such embodiments, the value indicating a number of links in the link bundle which is to trigger limited operation mode for the link bundle is a limited operation threshold value, e.g., a limited operation mode number of links for the link bundle.

Assembly of components 2100 further includes a component 2112 configured to store the limited operation threshold information in memory, and a component configured to determine limited operation mode link bundle metrics, e.g., one per bundle, to be advertised during limited operation mode of link bundle operation. Component 2118 includes a component 2120 configured to receive input, e.g., a maximum bundle link weight, on a per link bundle basis, indicating the limited operation mode link metric for each link bundle, and a component 2122 configured to automatically generate, on a per link bundle basis, a limited operation mode link metric for each link bundle. Component 2122 includes a component configured to multiply a normal link metric for a link by a multiplier factor to generate a limited operation mode link metric for the link bundle.

Assembly of components 2100 further includes a component 2126 configured to store limited operation mode link metrics in memory, e.g., in a per link bundle basis. Component 2126 includes a component 2128 configured to store, e.g., in memory, a limited operation mode link metric for the first link bundle. In some embodiments, component 2116 includes a component 2130 configured to store a limited operation mode link metric for the Nth link bundle.

Assembly of components 2100 further includes a component 2132 configured to monitor the status of links in each link bundle, e.g., determine the number of operational links in each link bundle and/or determine the number of failed links in each link bundle. Component 2132 includes a component 2134 configured to determine the number of operation links in the first link bundle, a component 2136 configured to determine the number of operational links in the second link bundle, and a component 2138 configured to determine the number of operational links in the Nth link bundle.

Assembly of components 2100 further includes a component configured to determine if the determined number of links in the link bundle is an initially determined value for the link bundle and to control operation as a function of the determination. Assembly of components 2100 further includes a component 2143 configured to store the determined number of operational links for the link bundle in memory as the number of currently operational links for the link bundle.

Assembly of components 2100 further includes a component 2142 configured to determine if the number of operational links in the link bundle has changed, e.g., to determine if the status of the link bundle with regard to the number of operational links has changed from the last monitoring period, e.g. due to one or more recently failed links in the link bundle and/or due to one or more recently repaired or improved links in the link bundle, and to control operation as a function of the determination, a component 2148 configured to update the number of currently operational links in memory for the link bundle to the determined number of operational links in the link bundle, e.g. in response to a determination the number of operational links in the link bundle has changed, and a component 2144 configured to leave the number of currently operational link in memory for the link bundle unchanged, e.g. in response to a determination that the determined number of operational links in the link bundle has not changed.

Assembly of components 2100 further includes a component 2150 configured to determine if the current number of operational links, e.g. good links, in the link bundle is above the limited operation threshold number for the link bundle and to control operation as a function of the determination, a component 2154 configured to set the current mode of operation for the link bundle, e.g., in memory, to normal operation mode, e.g., in response to a determination that the current number of operational links in the link bundle is above the limited operation mode threshold number for the link bundle, and a component 2156 configured to set the advertise link metric indicator to advertise, e.g., set the indicator to yes for advertise, e.g. in response to the determination that the current number of operational links is above the limited operation threshold number for the link bundle, and a component 2158 configured to advertise the normal operation link metric for the link bundle, e.g. in response to the determination that the current mode of operation for the link bundle is normal operation mode and the advertise link metric indicator is set to yes. In some embodiments, component 2158 is configured to control a transmitter in the node to transmit the normal link metric for the link bundle.

Assembly of components 2100 further includes a component 2160 configured to determine if there are any operational links in the link bundle, e.g., determine if the number of operational links in the link bundle is greater than zero, and to control operation as a function of the determination, a component 2162 configured to set the adverse link metric indicator to no, e.g. in response to a determination that there are zero currently operational links in the link bundle, and a component 2163 configured to control the node to refrain from advertising a link metric for the link bundle when the advertise link metric indicator for the link bundle is set to a no.

Assembly of components 2100 further includes a component 2164 configured to determine that the number of operation links in the link bundle is a number which triggers limited operation mode of operating the link bundle, e.g. in response to a determination that the number of currently operational links in the link bundle is a value in the range of {1, . . . limited operation threshold number}, including the endpoints of the range. Assembly of components, 2100 further includes a component 2166 configured to set the current mode of bundle operation to limited operation mode, e.g., set an indicator in memory to indicate limited operation mode for the link bundle, e.g., in response to the determination that the number of operational links is a number which triggers limited operation mode for the link bundle. Assembly of components 2100 further includes a component 2166 configured to set the advertise link metric indicator for the link bundle to yes, e.g., in response to the currently mode of operation for the link bundle being set to limited operation mode, and a component 2170 configured to advertise the limited operation mode link metric for the link bundle, e.g., in response the link bundle mode of operation being limited operation mode and the advertise link metric indicator being set to yes. In some embodiments, component 2170 is configured to control a transmitter in the node to transmit the limited operation link metric for the link bundle.

First Numbered List of Exemplary Embodiments

Method Embodiment 1

A method of operating a first network node in a communications network, the method comprising: determining (1104) a normal link bundle metric for a first link bundle including a plurality of communications links between a first network node and a second network node; determining (1114 or 1124) a limited operation mode link bundle metric for the first link bundle; making (1130) a first link bundle metric advertising decision, said first link bundle metric advertising decision being a decision to: i) advertise the normal link bundle metric for the first link bundle; ii) advertise the limited operation mode link bundle metric for the first link bundle; or iii) perform no advertising of a link bundle metric for the first link bundle; and taking (1152) an advertising action in accordance with the determined first link bundle metric advertising decision, said advertising action including operating the first node to: i) advertise (1158) the normal link bundle metric for the first link bundle, ii) advertise (1162) the limited operation mode link bundle metric for the first link bundle or iii) control (1166) the first node to refrain from advertising a link bundle metric for the first link bundle.

Method Embodiment 2

The method of Method Embodiment 1, wherein advertising (1158) the normal link bundle metric for the first link bundle or advertising (1162) the limited operation mode link bundle metric for the first link bundle includes operating (1160 or 1164) a transmitter in the first node to transmit the link bundle metric to be advertised; and wherein controlling (1166) the first node to refrain from adverting a link bundle metric for the first link bundle includes setting (1168) a value in memory indicating that a link bundle metric is not to be transmitted for the first link bundle.

Method Embodiment 3

The method of Method Embodiment 1, wherein determining (1104) a normal link bundle metric for a first link bundle including a plurality of communications links between a first network node and a second network node includes: receiving (1106) input indicating a first normal link bundle metric corresponding to the first link bundle; and using (1108) the received first normal link bundle metric as the determined normal link bundle metric for the first link bundle.

Method Embodiment 4

The method of Method Embodiment 1 wherein determining (1104) a normal link bundle metric for a first link bundle includes: automatically generating (1110) the normal link bundle metric for the first link bundle using an automated link weight generation algorithm.

Method Embodiment 5

The method of Method Embodiment 4, wherein said step of automatically generating (1110) the normal link bundle metric for the first link bundle includes using (1112) a link weight generation algorithm to generate said normal link bundle metric for the first link bundle.

Method Embodiment 6

The method of Method Embodiment 3, wherein determining (1114) a limited operation mode link bundle metric for the first link bundle includes: receiving (1116) input indicating a first limited operation mode link bundle metric corresponding to the first link bundle; and using (1118) the received first limited operation mode link bundle metric as the determined limited operation mode link bundle metric for the first link bundle.

Method Embodiment 7

The method of Method Embodiment 3, wherein determining (1114) a limited operation mode link bundle metric for the first link bundle includes: setting (1120) the limited operation mode link bundle metric for the first link bundle to a maximum link metric value (e.g., set the metric to the largest permitted link weight value to discourage its use where large values indicate links with longer paths or which are more costly in this way causing the routing system to avoid use of the faulty link bundle unless there are no other alternative links available since the path is indicated to be the most costly a path can be).

Method Embodiment 8

The method of Method Embodiment 3, wherein determining (1114 or 1124) a limited operation mode link bundle metric for the first link bundle includes: multiplying (1119 or 1126) the first normal link metric corresponding to the first link bundle by a cost factor greater than one to generate the limited operation mode link bundle metric for the first link bundle.

Method Embodiment 9

The method of Method Embodiment 8, wherein said cost factor is a function of the current number of good links.

Method Embodiment 10

The method of Method Embodiment 9, further comprising: determining (1125) said cost factor as a function of the determined number of good links in the first link bundle.

Method Embodiment 11

The method of Method Embodiment 8, wherein the cost factor is larger when the number of good links in the first bundle is less than a first limited operation mode number of links than when the number of good links is equal to the first limited operation number of links.

Method Embodiment 12

The method of Method Embodiment 1, wherein making (1130) a first link bundle metric advertising decision includes: determining (1132) if a current number of good links in the first link bundle is above a first limited operation mode number of links (where above the first limited operation mode number of links indicates that the first link bundle is operating in normal mode with all links or at least a sufficient number of good links to support normal link bundle mode operation, e.g., with a sufficient number of links to support a normal expected traffic load).

Method Embodiment 13

The method of Method Embodiment 12, further comprising: prior to determining (1132) if a current number of good links in the first link bundle is above a first limited operation mode number of links, determining (1122) the number of good links in the first link bundle.

Method Embodiment 14

The method of Method Embodiment 12, wherein making (1130) a first link bundle metric advertising decision further includes: deciding (1136) to advertise the normal link bundle metric for the first link bundle in response to determining that a current number of good links in the first link bundle is above a first limited operation mode number of links.

Method Embodiment 15

The method of Method Embodiment 12, wherein making (1130) a first link bundle metric advertising decision further includes: determining (1138) if the current number of good links in the first link bundle is a non-zero number of good links which is equal to or below the first limited operation mode number of links.

Method Embodiment 16

The method of Method Embodiment 15, wherein making (1130) a first link bundle metric advertising decision further includes: deciding (1142) to advertise the limited operation mode link bundle metric for the first link bundle in response to determining that the current number of good links in the first link bundle is a non-zero number of good links which is equal to or below the first limited operation mode number of links.

Method Embodiment 17

The method of Method Embodiment 15, wherein making (1130) a first link bundle metric advertising decision further includes: determining (1144) that the current number of good links in the first link bundle is zero; and deciding (1146) not to advertise the limited operation mode link bundle metric for the first link bundle in response to determining that the current number of good links in the first link bundle is zero. (When number of good links in first bundle is zero, no links metric will be advertised for the first bundle and thus devices will not consider using the first link bundle as a viable link when making routing decisions based on advertised link metrics, e.g., link weights which can be used for shortest path first, lowest cost path routing or other forms of link weight-based routing decisions).

Second Numbered List of Exemplary Embodiments

Apparatus Embodiment 1

A first network node (1200) in a communications network (100), the first network node comprising: a processor (1202) configured to: determine (1104) a normal link bundle metric for a first link bundle including a plurality of communications links between a first network node and a second network node; determine (1114 or 1124) a limited operation mode link bundle metric for the first link bundle; make (1130) a first link bundle metric advertising decision, said first link bundle metric advertising decision being a decision to: i) advertise the normal link bundle metric for the first link bundle; ii) advertise the limited operation mode link bundle metric for the first link bundle; or iii) perform no advertising of a link bundle metric for the first link bundle; and control the first node to take (1152) an advertising action in accordance with the determined first link bundle metric advertising decision, said advertising action including operating the first node to: i) advertise (1158) the normal link bundle metric for the first link bundle, ii) advertise (1162) the limited operation mode link bundle metric for the first link bundle or iii) control (1166) the first node to refrain from advertising a link bundle metric for the first link bundle.

Apparatus Embodiment 2

The first network node of Apparatus Embodiment 1, further including: a transmitter (1258); a memory (1212); and wherein advertising (1158) the normal link bundle metric for the first link bundle or advertising (1162) the limited operation mode link bundle metric for the first link bundle includes operating (1160 or 1164) said transmitter in the first node to transmit the link bundle metric to be advertised; and wherein controlling (1166) the first node to refrain from adverting a link bundle metric for the first link bundle includes setting (1168) a value in memory indicating that a link bundle metric is not to be transmitted for the first link bundle.

Apparatus Embodiment 3

The first network node of Apparatus Embodiment 1, further comprising: a receiver (1246) configured to receive (1106) input indicating a first normal link bundle metric corresponding to the first link bundle; and wherein the processor further configured as part of determining (1104) a normal link bundle metric for a first link bundle including a plurality of communications links between a first network node and a second network node to: use (1108) the received first normal link bundle metric as the determined normal link bundle metric for the first link bundle.

Apparatus Embodiment 4

The first network node of Apparatus Embodiment 1, wherein said processor is configured, as part of determining (1104) a normal link bundle metric for a first link bundle to: automatically generating (1110) the normal link bundle metric for the first link bundle using an automated link weight generation algorithm.

Apparatus Embodiment 5

The first network node of Apparatus Embodiment 4, wherein said processor, as part of automatically generating (1110) the normal link bundle metric for the first link bundle, uses (1112) a link weight generation algorithm to generate said normal link bundle metric for the first link bundle.

Apparatus Embodiment 6

The first network node of Apparatus Embodiment 3, wherein the receiver is further configured to receive (1116) input indicating a first limited operation mode link bundle metric corresponding to the first link bundle; and wherein the processor is further configured as part of determining (1114) a limited operation mode link bundle metric for the first link bundle to: use (1118) the received first limited operation mode link bundle metric as the determined limited operation mode link bundle metric for the first link bundle.

Apparatus Embodiment 7

The first network node of Apparatus Embodiment 3, wherein the processor is further configured, as part of determining (1114) a limited operation mode link bundle metric for the first link bundle to: set (1120) the limited operation mode link bundle metric for the first link bundle to a maximum link metric value (e.g., set the metric to the largest permitted link weight value to discourage its use where large values indicate links with longer paths or which are more costly in this way causing the routing system to avoid use of the faulty link bundle unless there are no other alternative links available since the path is indicated to be the most costly a path can be).

Apparatus Embodiment 8

The first network node of Apparatus Embodiment 3, wherein said processor is further configured to multiply (1119 or 1126) the first normal link metric corresponding to the first link bundle by a cost factor greater than one to generate the limited operation mode link bundle metric for the first link bundle, as part of being configured to determine (1114 or 1124) a limited operation mode link bundle metric for the first link bundle.

Apparatus Embodiment 9

The first network node of Apparatus Embodiment 8, wherein said cost factor is a function of the current number of good links.

Apparatus Embodiment 10

The first network node of Apparatus Embodiment 9, wherein said processor is further configured to: determine (1125) said cost factor as a function of the determined number of good links in the first link bundle.

Apparatus Embodiment 11

The first network node of Apparatus Embodiment 8, wherein the cost factor is larger when the number of good links in the first bundle is less than a first limited operation mode number of links than when the number of good links is equal to the first limited operation number of links.

Apparatus Embodiment 12

The first network node of Apparatus Embodiment 1, wherein said processor is further configured to: determine (1132) if a current number of good links in the first link bundle is above a first limited operation mode number of links, as part of being configured to make (1130) a first link bundle metric advertising decision. (Where above the first limited operation mode number of links indicates that the first link bundle is operating in normal mode with all links or at least a sufficient number of good links to support normal link bundle mode operation, e.g., with a sufficient number of links to support a normal expected traffic load).

Apparatus Embodiment 13

The first network node of Apparatus Embodiment 12, wherein said processor is further configured to: determine (1122) the number of good links in the first link bundle, prior to determining (1132) if a current number of good links in the first link bundle is above a first limited operation mode number of links.

Apparatus Embodiment 14

The first network node of Apparatus Embodiment 12, wherein said processor is further configured to decide (1136) to advertise the normal link bundle metric for the first link bundle in response to determining that a current number of good links in the first link bundle is above a first limited operation mode number of links, as part of being configured to make (1130) a first link bundle metric advertising decision.

Apparatus Embodiment 15

The first network node of Apparatus Embodiment 12, wherein said processor is further configured to determine (1138) if the current number of good links in the first link bundle is a non-zero number of good links which is equal to or below the first limited operation mode number of links, as part of being configured to make (1130) a first link bundle metric advertising decision.

Apparatus Embodiment 16

The first network node of Apparatus Embodiment 15, wherein said processor is further configured to decide (1142) to advertise the limited operation mode link bundle metric for the first link bundle in response to determining that the current number of good links in the first link bundle is a non-zero number of good links which is equal to or below the first limited operation mode number of links, as part of being configured to make (1130) a first link bundle metric advertising decision.

Apparatus Embodiment 17

The first network node of Apparatus Embodiment 15, wherein said processor is further configured to: determine (1144) that the current number of good links in the first link bundle is zero; and decide (1146) not to advertise the limited operation mode link bundle metric for the first link bundle in response to determining that the current number of good links in the first link bundle is zero, said being configured to determine and decide being part of being configured to make (1130) a first link bundle metric advertising decision. (when number of good links in first bundle is zero, no links metric will be advertised for the first bundle and thus devices will not consider using the first link bundle as a viable link when making routing decisions based on advertised link metrics, e.g., link weights which can be used for shortest path first, lowest cost path routing or other forms of link weight-based routing decisions).

Third Number Set of Exemplary Embodiments

Computer Readable Medium Embodiment 1 A non-transitory computer readable medium (1212) including computer executable instructions which when executed by a processor (1202) of a first network node (1200) cause the first network node (1200) to perform the steps of: determining (1104) a normal link bundle metric for a first link bundle including a plurality of communications links between a first network node and a second network node; determining (1114 or 1124) a limited operation mode link bundle metric for the first link bundle; making (1130) a first link bundle metric advertising decision, said first link bundle metric advertising decision being a decision to: i) advertise the normal link bundle metric for the first link bundle; ii) advertise the limited operation mode link bundle metric for the first link bundle; or iii) perform no advertising of a link bundle metric for the first link bundle; and taking (1152) an advertising action in accordance with the determined first link bundle metric advertising decision, said advertising action including operating the first node to: i) advertise the normal link bundle metric for the first link bundle, ii) advertise the limited operation mode link bundle metric for the first link bundle or iii) control the first node to refrain from advertising a link bundle metric for the first link bundle.

The techniques of various embodiments may be implemented using software, hardware and/or a combination of software and hardware. Various embodiments are directed to apparatus, e.g., routers, network nodes, user devices, base stations, servers, customer premises equipment devices, cable systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating routers, network nodes, user devices, base stations, gateways, servers, cable networks, cloud networks, nodes, servers, cloud service servers, customer premises equipment devices, controllers, network monitoring nodes/servers and/or cable or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., communications nodes such as controllers are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as a cluster controller including, with a processor which includes a component corresponding to each of the steps of the various described methods performed by the device in which the processor is included. In some but not all embodiments a device, e.g., communications node such as a controller, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a router, a controller or other device described in the present application. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a first network node in a communications network, the method comprising:
    determining a number of operational links in a first link bundle;
    making a first link bundle metric advertising decision, said first link bundle metric advertising decision being a decision to: i) advertise a normal link bundle metric for the first link bundle when the first link bundle includes no failed links; ii) advertise a normal link bundle metric when the first link bundle includes one or more failed links and the total number of operational links in the first link bundle exceeds a first limited operation mode number of links; iii) advertise a limited operation mode link bundle metric for the first link bundle when the number of operational links is non-zero and equal to or below the said first limited operation mode number; and iv) perform no advertising of a link bundle metric for the first link bundle when the number of operational links is zero; and
    taking an advertising action in accordance with the first link bundle metric advertising decision, said advertising action including operating the first network node to: i) advertise the normal link bundle metric for the first link bundle, ii) advertise the limited operation mode link bundle metric for the first link bundle or iii) refrain from advertising a link bundle metric for the first link bundle.

2. The method of claim 1,
    wherein advertising the normal link bundle metric for the first link bundle or advertising the limited operation mode link bundle metric for the first link bundle includes operating a transmitter in the first network node to transmit the link bundle metric to be advertised; and
    wherein operating the first network node to refrain from advertising a link bundle metric for the first link bundle includes setting a value in memory indicating that a link bundle metric is not to be transmitted for the first link bundle.

3. The method of claim 1, further comprising:
    determining a normal link bundle metric for the first link bundle, said first link bundle including a plurality of communications links between the first network node and a second network node, said determining a normal link bundle metric for the first link bundle including:
        receiving input indicating a first normal link bundle metric corresponding to the first link bundle; and
        using the received first normal link bundle metric as the determined normal link bundle metric for the first link bundle.

4. The method of claim 1, further comprising:
    automatically generating the normal link bundle metric for the first link bundle using an automated link weight generation algorithm.

5. The method of claim 1, further comprising:
    receiving input indicating a first limited operation mode link bundle metric corresponding to the first link bundle; and
    using the received first limited operation mode link bundle metric as the determined limited operation mode link bundle metric for the first link bundle.

6. The method of claim 1, further comprising:
    setting the limited operation mode link bundle metric for the first link bundle to a maximum link metric value.

7. The method of claim 1, wherein making a first link bundle metric advertising decision includes:
    determining if a current number of good links in the first link bundle is above the first limited operation mode number of links.

8. The method of claim 7, further comprising:
    prior to determining if a current number of good links in the first link bundle is above the first limited operation mode number of links, determining the number of good links in the first link bundle.

9. The method of claim 7,
    wherein the first link bundle includes a failed link; and
    wherein making a first link bundle metric advertising decision further includes:
    deciding to advertise the normal link bundle metric for the first link bundle in response to determining that a current number of good links in the first link bundle is above the first limited operation mode number of links.

10. The method of claim 9, wherein the first limited operation mode number of links is three.

11. The method of claim 7, wherein making a first link bundle metric advertising decision further includes:
    determining if the current number of good links in the first link bundle is a non-zero number of good links which is equal to or below the first limited operation mode number of links.

12. The method of claim 7, wherein making a first link bundle metric advertising decision further includes:
deciding to advertise the limited operation mode link bundle metric for the first link bundle in response to determining that the current number of good links in the first link bundle is a non-zero number of good links which is equal to or below the first limited operation mode number of links.

13. The method of claim 7, wherein making a first link bundle metric advertising decision further includes:
determining that the current number of good links in the first link bundle is zero; and
deciding not to advertise the limited operation mode link bundle metric for the first link bundle in response to determining that the current number of good links in the first link bundle is zero.

14. The method of claim 1, wherein the first link bundle is a bundle of Ethernet links.

15. The method of claim 14, wherein operating the transmitter in the first network node to transmit the link bundle metric to be advertised includes operating the transmitter to transmit the link bundle metric to be advertised using Link Aggregation Control Protocol (LACP).

16. A first network node in a communications network, the first network node comprising:
a processor configured to:
control the first network node to determine a number of operational links in a first link bundle;
make a first link bundle metric advertising decision, said first link bundle metric advertising decision being a decision to: i) advertise a normal link bundle metric for the first link bundle when the first link bundle includes no failed links; ii) advertise a normal link bundle metric when the first link bundle includes one or more failed links and the total number of operational links in the first link bundle exceeds a first limited operation mode number of links; iii) advertise a limited operation mode link bundle metric for the first link bundle when the number of operational links is non-zero and equal to or below the said first limited operation mode number; and iv) perform no advertising of a link bundle metric for the first link bundle when the number of operational links is zero; and
control the first network node to take an advertising action in accordance with the determined first link bundle metric advertising decision, said advertising action including operating the first node to: i) advertise the normal link bundle metric for the first link bundle, ii) advertise the limited operation mode link bundle metric for the first link bundle or iii) refrain from advertising a link bundle metric for the first link bundle.

17. The first network node of claim 16, further including:
a transmitter;
a memory; and
wherein advertising the normal link bundle metric for the first link bundle or advertising the limited operation mode link bundle metric for the first link bundle includes operating a transmitter in the first network node to transmit the link bundle metric to be advertised; and
wherein operating the first network node to refrain from advertising a link bundle metric for the first link bundle includes setting a value in memory indicating that a link bundle metric is not to be transmitted for the first link bundle.

18. The first network node of claim 16, further comprising:
a receiver configured to receive input indicating the normal link bundle metric corresponding to the first link bundle.

19. The first network node of claim 16, wherein said processor is further configured to:
automatically generate the normal link bundle metric for the first link bundle using an automated link weight generation algorithm.

20. The first network node of claim 16, wherein said processor is further configured to:
determine if a current number of good links in the first link bundle is above said first limited operation mode number of links, as part of being configured to make a first link bundle metric advertising decision.

21. The first network node of claim 20, wherein said processor is further configured to
decide to advertise the normal link bundle metric for the first link bundle in response to determining that a current number of good links in the first link bundle is above said first limited operation mode number of links, as part of being configured to make a first link bundle metric advertising decision.

22. The first network node of claim 20, wherein said processor is further configured to determine if the current number of good links in the first link bundle is a non-zero number of good links which is equal to or below the first limited operation mode number of links, as part of being configured to make a first link bundle metric advertising decision.

23. The first network node of claim 16, wherein the first link bundle is a bundle of Ethernet links.

24. The first network node of claim 23, wherein operating a transmitter in the first network node to transmit the link bundle metric to be advertised includes using Link Aggregation Control Protocol (LACP) for the advertisement.

25. A non-transitory computer readable medium including computer executable instructions which when executed by a processor of a first network node cause the first network node to perform the steps of:
making a first link bundle metric advertising decision, said first link bundle metric advertising decision being a decision to: i) advertise a normal link bundle metric for the first link bundle when the first link bundle includes no failed links; ii) advertise a normal link bundle metric when the first link bundle includes one or more failed links and the total number of operational links in the first link bundle exceeds a first limited operation mode number of links; iii) advertise a limited operation mode link bundle metric for the first link bundle when the number of operational links is non-zero and equal to or below the said first limited operation mode number; and iv) perform no advertising of a link bundle metric for the first link bundle when the number of operational links is zero; and
taking an advertising action in accordance with the determined first link bundle metric advertising decision, said advertising action including operating the first network node to: i) advertise the normal link bundle metric for the first link bundle, ii) advertise the limited operation mode link bundle metric for the first link bundle or iii) refrain from advertising a link bundle metric for the first link bundle.

26. The non-transitory computer readable medium of claim 25, wherein the first link bundle is a bundle of Ethernet links.

27. The method of claim 26, wherein taking an advertising action in accordance with the determined first link bundle metric advertising decision includes using Link Aggregation Control Protocol (LACP) for an advertisement.

* * * * *